United States Patent
Chen et al.

(10) Patent No.: US 6,513,894 B1
(45) Date of Patent: Feb. 4, 2003

(54) METHOD AND APPARATUS FOR PRODUCING DROPS USING A DROP-ON-DEMAND DISPENSER

(75) Inventors: Alvin U. Chen, West Lafayette, IN (US); Osman A. Basaran, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/716,576

(22) Filed: Nov. 20, 2000

Related U.S. Application Data
(60) Provisional application No. 60/166,605, filed on Nov. 19, 1999.

(51) Int. Cl.[7] .............................................. B29J 29/38
(52) U.S. Cl. ........................................... 347/11; 347/9
(58) Field of Search ................................. 347/10, 11, 9

(56) References Cited

U.S. PATENT DOCUMENTS

| | | | |
|---|---|---|---|
| 3,683,212 A | 8/1972 | Zoltan | 310/8.3 |
| 3,946,398 A | 3/1976 | Kyser et al. | 347/70 |
| 4,251,824 A | 2/1981 | Hara et al. | 347/57 |
| 4,418,354 A | 11/1983 | Perduijn | 347/68 |
| 4,490,728 A | 12/1984 | Vaught et al. | 347/60 |
| 4,513,299 A | 4/1985 | Lee et al. | 347/15 |
| 4,584,590 A | 4/1986 | Fischbeck et al. | 347/69 |
| 4,879,568 A | 11/1989 | Bartky et al. | 347/69 |

(List continued on next page.)

FOREIGN PATENT DOCUMENTS

| | | | | |
|---|---|---|---|---|
| EP | 0 699 136 B1 | | 10/1997 | B41J/2/205 |
| EP | 0 827 838 A2 | * | 11/1998 | B41J/2/21 |
| JP | 05245000 A | * | 8/1993 | C12Q/1/68 |
| WO | WO 94/26522 | | 11/1994 | B41J/2/045 |

OTHER PUBLICATIONS

Adams, R.L. and Roy, J., A One Dimensional Numerical Model of a Drop–On–Demand Ink Jet, Journal of Applied Mechanics, (1986) 53:193–197.

Allen, Ross R.; Meyer, John D. and Knight, William R., Thermodynamics and Hyrodynamics of Thermal Ink Jets, Hewlett–Packard Journal (1985) pp. 21–27.

Badie, Ramin; De Lange, Dirk Frits, Mechanism of drop constriction in a drop–on–demand inkjet system, Proc. R. Soc. Lond. A, (1997) 453:2573–2581, The Royal Society, London, England.

Bassous, E.; Taub, H.H.; Kuhn, L., Ink jet printing nozzle arrays etched in silicon, Appl. Phys. Lett., (1999) 31(2):135–137, The American Institute of Physics.

Bermel, Alexandra D.; Bugner, D.E., Particle Size Effects in Pigmented Ink Jet Inks, Journal of Imaging Science and Technology, (1999) 43(4):320–324, The Society for Imaging Science and Technology.

(List continued on next page.)

*Primary Examiner*—John Barlow
*Assistant Examiner*—Alfred Dudding
(74) *Attorney, Agent, or Firm*—William F. Bahret

(57) ABSTRACT

A method and apparatus for dispensing fluid from a drop-on-demand (DOD) fluid dispenser. The method involves withdrawing fluid in the dispenser for a first duration of time, followed by a second duration of time during which the fluid is propelled toward the orifice of the dispenser. Following the period during which the fluid is propelled, there is a second withdrawing of the fluid into the dispenser. The duration of the propelling period is shorter than the duration of either the first withdrawing or the second withdrawing. The propelling of the fluid results in the extension of a small tongue of fluid from the meniscus of the fluid. The second withdrawing of the fluid results in a retraction of the meniscus into the passageway such that only the small tongue of fluid separates and is ejected from the dispenser.

31 Claims, 18 Drawing Sheets

U.S. PATENT DOCUMENTS

| | | | |
|---|---|---|---|
| 5,495,270 A | 2/1996 | Burr et al. | 347/10 |
| 5,557,304 A | 9/1996 | Stortz | 347/15 |
| 5,736,993 A | 4/1998 | Regimbal et al. | |
| 5,748,214 A | 5/1998 | Usui et al. | 347/70 |
| 5,757,391 A | 5/1998 | Hoisington | 347/11 |
| 5,777,636 A | 7/1998 | Naganuma et al. | 347/10 |
| 5,880,750 A | 3/1999 | Takahashi | 347/10 |
| 5,901,425 A | 5/1999 | Bibl et al. | 29/25.35 |
| 5,912,679 A | 6/1999 | Takayama et al. | 347/10 |
| 6,020,905 A | 2/2000 | Cornell et al. | 347/48 |
| 6,029,896 A | 2/2000 | Self et al. | 347/11 |
| 6,070,779 A * | 6/2000 | Baggerman et al. | 228/37 |
| 6,079,811 A | 6/2000 | Cornell et al. | 347/48 |
| 6,109,732 A | 8/2000 | Wen | 347/57 |
| 6,257,689 B1 * | 7/2001 | Yonekubo | 347/11 |
| 6,328,398 B1 * | 12/2001 | Chang | 347/11 |

OTHER PUBLICATIONS

Blanchard, A.P.; Kaiser, R.J. and Hood, L.E., High–density oligonucleotide arrays, Biosensors & Bioelectronics, (1996) 11(6/7):687–690, Elsevier Science Ltd., Great Britain.

Bui, Loc, Rheological, Thermomechanical, and Viscoelastic Requirements of an Ink–Jet Phase–Change Ink for an Offset Printing Process, Journal of Imaging Science and Technology, (1996) 40(5):386–389, The Society for Imaging Science and Technology.

Bugdayci, N.; Bogy, D.B. and Talke, F.E., Axisymmetric Motion of Radically Polarized Piezoelectric Cylinders Used in Ink Jet Printing, IBM. J. Res. Develop., (1983) 27(2):171–180.

Burr, Ronald F.; Tence, David A. and Berger, Sharon S., Multiple Dot Size Fluidics for Phase Change Piezoelectiic Ink Jets, IS&T's NIP12: International Conference on Digital Printing Technologies, (1996) pp. 12–18.

Chen, Ping–Hei, Peng, Hsin–Yah, Liu, Hsin–Yi; Chang, S.L., Wu, T.–I., Cheng, Chiang–Ho, Pressure response and droplet ejection of a piezoelectric inkjet printhead, International Journal of Mechanical Sciences (1999) 41:235–248, Elsevier Science Ltd., Oxford, England.

Deshpande, Narayan V., Significance of Inertance and Resistance in Fluidics of Thermal Ink–Jet Transducers, Journal of Imaging Science and Technology (1996) 40(5):396–400, The Society for Imaging Science and Technology.

Dijksman, J.F., Hydro–Acoustics of Piezoelectrically Driven Ink–Jet Print Heads, Flow, Turbulence and Combustion, (1998) 61(1/4):211–237, Kluwer Academic Publishers, London.

Dijksman, J.F., Hydrodynamics of small tubular pumps, J. Fluid Mech., (1984) 139:173–191.

Doring, M., Ink–jet printing, Philips tech. Rev., (1982) 40(7):192–198.

Fromm, J., A numerical study of drop–on demand ink jets, JPL (Jet Propulsion Laboratory) Publication 82–7 (1982) pp. 54–62, NASA, Jet Propulsion Laboratory, California Institute of Technology, Pasadena, California.

Fujii, Masahiko; Hamazaki, Toshinobu and Ikeda, Kenji, New Thermal Ink Jet Printhead with Improved Energy Efficiency Using Silicon Reactive Ion Etching, Journal of Imaging Science and Technology, (1999) 43(4):332–338, The Society for Imaging Science and Technology.

Gerhauser, Heinz; Hirschmann, Karl H.; Lee, Francis and Talke, Frank E., 11.6/11:25 a.m.: The Effect of Pulse Shape on the Drop Volume and the Frequency Response of Drop–On–Demand Ink Jet Transducers, IBM Research Laboratory's SID 83 Digest (1983) pp. 110,111, SID, Playa del Rey, California.

Hayes, Donald J.; Wallace, David B.; Boldman, Michael T. and Marusak, Ronald E., Picoliter Solder Droplet Dispensing, The International Journal of Microcircuits and Electonic Packaging, (1993) 16(3):173–180, The International Society for Hybrid Microelectronics.

Grassia, P., The Design of a Droplet Ejector, Transactions of the ASME (1999) 121:658–664, ASME.

Heinzl, J. and Hertz, C.H., Ink–Jet Printing, Advances in Electronics and Electron Physics, (1985) 65:91–171, Harcourt Brace Jovanovich, San Diego.

Hofer, E.P., Spot Size Modulation in Drop–On–Demand Ink–Jet Technology, Proceedings of the SID, (1986) 27(1):37–40, Palisades Institute for Research Services, Inc., New York, New York.

Hofer, E.P., 17.3 Spot Size Modulation In Drop–On–Demand Ink–Jet Technology, SID International Symposium Digest (1985) pp. 321–322, SID, Playa del Rey, California.

Kamphoefner, Fred J., Ink Jet Printing, IEEE Transactions on Electron Devices, (1972) 19(4):584–593, IEEE.

Kang, Henry R., Water–Based Ink–Jet Ink I. Formulation, Journal of Imaging Science, (1991) 35(3):179–188, The Society for Imaging Science and Technology.

Kang, Henry R., Water–Based Ink–Jet Ink II. Characterization, Journal of Imaging Science, (1991) 35(3):189–194, The Society for Imaging Science and Technology.

Kang, Henry R., Water–Based Ink–Jet III. Performance Studies, Journal of Imaging Science, (1991) 35(3):195–201, The Society for Imaging Science and Technology.

Kitahara, Tsuyoshi, Ink Jet Head with Multi–Layer Piezoelectric Actuator, Proceedings of IS&T's Eleventh International Congress on Advances in Non–Impact Printing Techniques, (1995) pp. 346–349.

Kuhn, Larry and Myers, Robert A., Ink–Jet Printing, Scientific American, (1979) pp. 162–178.

Kyser, Edmond L.; Collins, Leland F. and Herbert, Nick, Design of an Impulse Ink Jet, Journal of Applied Photographic Engineering, (1981) 7(3):73–79, Society of Photographic Scientists & Engineers.

Le, Hue P., Progress and Trends in Ink–Jet Printing Technology, Journal of Imaging Science and Technology, (1998) 42(1):49–62, The Society for Imaging Science and Technology.

Lemmo, Anthony V.; Fisher, Jeffrey T.; Geysen, H. Mario and Rose, Donald J., Characterization of an Inkjet Chemical Microdispenser for Combinatorial Library Synthesis, Analytical Chemistry, (1997) 69(4):543–551, The American Chemical Society.

Lorenze, Robert V. and Kuhman, Daniel E., Correlation of Misdirected Satellite Drops and Resultant Print Quality Defects with Nozzle Face Geometries in Thermal Ink Jet Printheads, Journal of Science and Technology, (1995) 39(6):491–494, The Society for Imaging Science and Technology.

MacFarlane, D.L.; Narayan, V.; Tatum, J.A.; Cox, W.R., Chen, T. and Hayes, D.J., Microjet Fabrication of Microlens Arrays, IEEE Photonics Technology Letters, (1994) 6(9):1112–1114, IEEE.

Manufacturing Parts, Drop by Drop; Making Parts, Drop by Drop May Change Manufacturing by Simplifying It. However, Much Fundamental Work Remains, Compressed Air Magazine, (1995) pp. 38–44.

Palm, Lars and Nilsson, Johan, An Optical Method for Measuring Drop Flight Stability in a Continuous Ink Jet, Journal of Imaging Science and Technology, (1997) 41(1):48–53, The Society for Imaging Science and Technology.

Peeters, Eric and Verdonckt–Vandebroek, Sophie, Thermal Ink Jet Technology, Circuits and Devices, (1997) pp. 19–23, IEEE.

Rembe, Christian; Patzer, Joachim; Hopfer, Eberhard P. and Krehl, Peter, Realcinematographic Visualization of Droplet Ejection in Thermal Ink Jets, Journal of Imaging Science and Technology, (1996) 40(5):400–404, The Society for Imaging Science & Technology.

Rembe, Christian; Aus Der Weische, Stefan; Beuten, Michael and Hofer, Eberhard P., Investigations of Nonproducible Phenomena in Thermal Ink Jets with Real High-–Speed Cine Photomicrography, Journal of Imaging Science and Technology, (1999) 43(4):325–331, The Society for Imaging Science and Technology.

Schober, A.; Gunther, R.; Schweinhorst, A.; Doring, M. and Lindemann, B.F., Accurate High–Speed Liquid Handling of Very Small Biological Samples, BioTechniques, (1993) 15(2):324–329.

Shah, Pratik; Kevrekidis, Yannis and Benziger, Jay, Ink–Jet Printing of Catalyst Patterns for Electroless Metal Deposition, Langmuir (1999) 15:1584–1587, American Chemical Society.

Sheild, T.W.; Bogy, D.B. and Talke, F.E., Drop formation by DOD ink–jet nozzles: A comparison of experiment and numerical simulation, IBM J. Res. Develop., (1987) 31(1):96–110, International Business Machines Corporation.

Takahashi, Masahiro; Ushioda, Toyoji; Uematsu, Ryosuke; Tagawa, Norio and Fukuchi, Hiromichi, Full–Color Ink–Jet Printer, NEC Research & Develop., (1986) 80:38–41, C & C Research Laboratories.

Wallace, David B.; Shah, Virang; Hayes, Donald J. and Grove, Michael E., Photorealistic Ink–Jet Printing Through Dynamic Spot Size Control, Journal of Imaging Science and Technology, (1996) 40(5):390–395, The Society for Imaging Science and Technology, Springfield, Virginia.

\* cited by examiner

METHOD AND APPARATUS FOR PRODUCING DROPS USING A DROP-ON-DEMAND DISPENSER

CROSS REFERENCE TO RELATED APPLICATIONS

This application claims priority to U.S. Provisional Application Serial No. 60/166,605, filed Nov. 19, 1999, incorporated herein by reference.

GOVERNMENT RIGHTS

Some support for this invention was provided by the U.S. government under Grant No. DE-FG02-96ER14641 awarded by the U.S. Department of Energy. The government may have certain rights in the invention.

FIELD OF THE INVENTION

The present invention relates to method and apparatus for producing small radius drops from a larger radius orifice using a drop-on-demand drop dispenser, and more particularly from a dispenser that is piezoelectrically driven.

BACKGROUND OF THE INVENTION

The use of drop-on-demand (DOD) inkjet technologies is becoming increasingly widespread in many industrial applications ranging from gene chip production to separations to paper printing. Since the development of the first DOD inkjet devices, great advances in inkjet technologies have made ink-jets economical and versatile. As popularity of ink-jets grows so does the need to understand the factors which contribute to drop quality (e.g. drop speed, accuracy, and uniformity). Additionally, gene chip arraying devices have the special requirement that they should be capable to dispensing many different types of liquids using a given nozzle, where a typical ink-jet printer may dispense only a single ink formulation per nozzle.

Currently, the most powerful methods by which to study DOD drop formation involve using direct visualization to examine effects of varying system parameters on drop quality. The simplest method to capture images of working DOD nozzles is by using stroboscopic camera systems. Stroboscopic techniques have been used for more than sixty years to image drop formation and interface rupture dynamics. More recently, the development of CCD cameras and diode lighting systems offers inexpensive methods of obtaining images at high temporal and spatial resolution. However, in order for stroboscopic analysis to be effective, the drop to drop variation in dispenses must be small. Stroboscopic methods cannot image the evolution in time of a single drop which can be a disadvantage when it is desirable to image only the first few drops.

Alternatives to stroboscopic cameras are high speed digital imaging systems which can acquire frames at rates from 1,000 to 100 million frames per second with exposure times ranging from milliseconds to nanoseconds. While slower digital imagers have been used extensively to study drop formation from capillaries at constant flow rate, they are too slow to capture the dynamics of inkjet drop formation which occurs on microsecond time scales. Ultrafast imagers (microsecond to nanosecond resolution) are relatively new and little work has been done with DOD ink-jet imaging using these cameras. Ultrafast imaging is a powerful tool which is useful not only for diagnostic imaging (e.g. evaluating drop quality), but can also be quite useful in designing DOD dispense methods as well as optimizing system performance. Digital camera systems now provide imaging at high speed and resolution with convenience and ease of use heretofore unparalleled. Changes in performance in ink-jet nozzles with varying system parameters can be observed very quickly in great detail so that time for system optimization can be minimized.

Redesigning existing ink-jet nozzles and developing novel dispensers is a route by which innovations in the drop dispensing technology can develop. However, a simple method to improve drop dispense quality is to adjust operating parameters (e.g. line pressure, electrical control signal, liquid properties) to produce optimal drop dispense.

Some DOD dispensing systems currently in use utilize electrical control signals with particular characteristics in order to achieve the desired drop qualities. For example, some existing systems use a control signal that consists of a waveform with a single polarity, such as half of a square wave. Yet other existing systems use an electrical control signal consisting of two portions, one portion being of a first polarity and the other portion being of a second and opposite polarity, such as a single, full square wave. In some cases, the timed durations of the two portions are identical. Many of these systems provide an electrical control signal that grossly produces one or more large drops, the large drops being created by a fluid meniscus which takes on a generally convex shape on the exterior of ejecting orifice. The large drop is formed when the edges of the meniscus in contact with the orifice separate from the orifice. These systems produce drops of a diameter equal to or greater than the diameter of the orifice. Yet other systems produce drops by resonating the meniscus. Such systems do not generally move the meniscus either toward the exterior of the dispenser, or toward the internal passage of the dispenser, but simply create oscillatory conditions on the meniscus. The drop quality of such oscillatory dispensing methods are likely to be subject to manufacturing imperfections near the orifice, or deposits of material near the orifice, such as dried ink.

The present invention overcomes these disadvantages in novel and unobvious ways.

SUMMARY OF THE INVENTION

One aspect of the present of the current invention concerns a method for expelling a drop of fluid from an orifice. The method comprises providing a body defining a passageway terminating at an orifice, with fluid being contained in the passageway proximate to the orifice, and the fluid forming a meniscus in the passageway. The method includes a first withdrawing of the fluid in the passageway in a first direction from the orifice. After said first withdrawing there is a propelling of the fluid in the passageway in a second direction opposite to the first direction and toward the orifice. After the propelling, there is a second withdrawing of the fluid in the passageway in the first direction. The withdrawing is continued for a time sufficient to retract a portion of the meniscus and after the retracting, a drop of fluid is expelled from the orifice.

Another aspect of the present invention concerns a method for expelling a drop of fluid from an orifice. The method includes providing a body defining a passageway terminating at an orifice, with fluid being contained in the passageway proximate to the orifice. There is a first withdrawing of the fluid in the passageway in a first direction from the orifice for a first duration of time. After the first withdrawing, there is a propelling of the fluid in the passageway in a second direction opposite to the first direction and toward the orifice for a second duration of time less than the first duration. After the propelling, there is a second withdrawing of the fluid in the passageway in the first direction. The method includes expelling a drop of fluid from the orifice.

Another aspect of the present invention concerns a method for expelling a drop of fluid from an orifice. The method includes providing a body defining a passageway terminating at an orifice, with fluid being contained in the passageway proximate to the orifice. The method also includes a first withdrawing of the fluid in the passageway in a first direction from the orifice. After the first withdrawing, there is a propelling of the fluid in the passageway in a second direction opposite of the first direction and toward the orifice for a first duration of time. After the propelling, there is a second withdrawing of the fluid in the passageway in the first direction for a second duration of time greater than the first duration. The method includes expelling a drop of the fluid from the orifice.

Another aspect of the present invention concerns an apparatus for ejecting a drop of fluid from an orifice. The apparatus comprises a body defining a passageway terminating at an orifice and a reservoir of fluid in the passageway, the fluid forming a meniscus in the passageway. The apparatus includes a piezoelectric actuator coupled to the body and actuatable to withdraw fluid in said passageway away from the orifice and actuatable to propel fluid in the passageway toward the orifice. There is also a controller providing a control signal to actuate the piezoelectric driver and including first, second, and third portions. The piezoelectric actuator withdraws fluid in the passageway toward the interior in response to the first and third portions, and propels fluid in the passageway toward the orifice in response to the second portion. The second portion follows the first portion and the third portion follows the second portion. The first portion retracts the meniscus from the orifice with a first velocity. The second portion propels the fluid in the center of the passageway toward the orifice with a second velocity greater than the first velocity. The third portion retracts the meniscus from the orifice, and an outward tongue of fluid forms on the meniscus after the retraction, separates from the meniscus, and is ejected as a drop.

These and other objects of the present invention will be apparent from the description of the preferred embodiment, the claims and the drawings to follow.

DESCRIPTION OF THE PREFERRED EMBODIMENT

Figure 1:
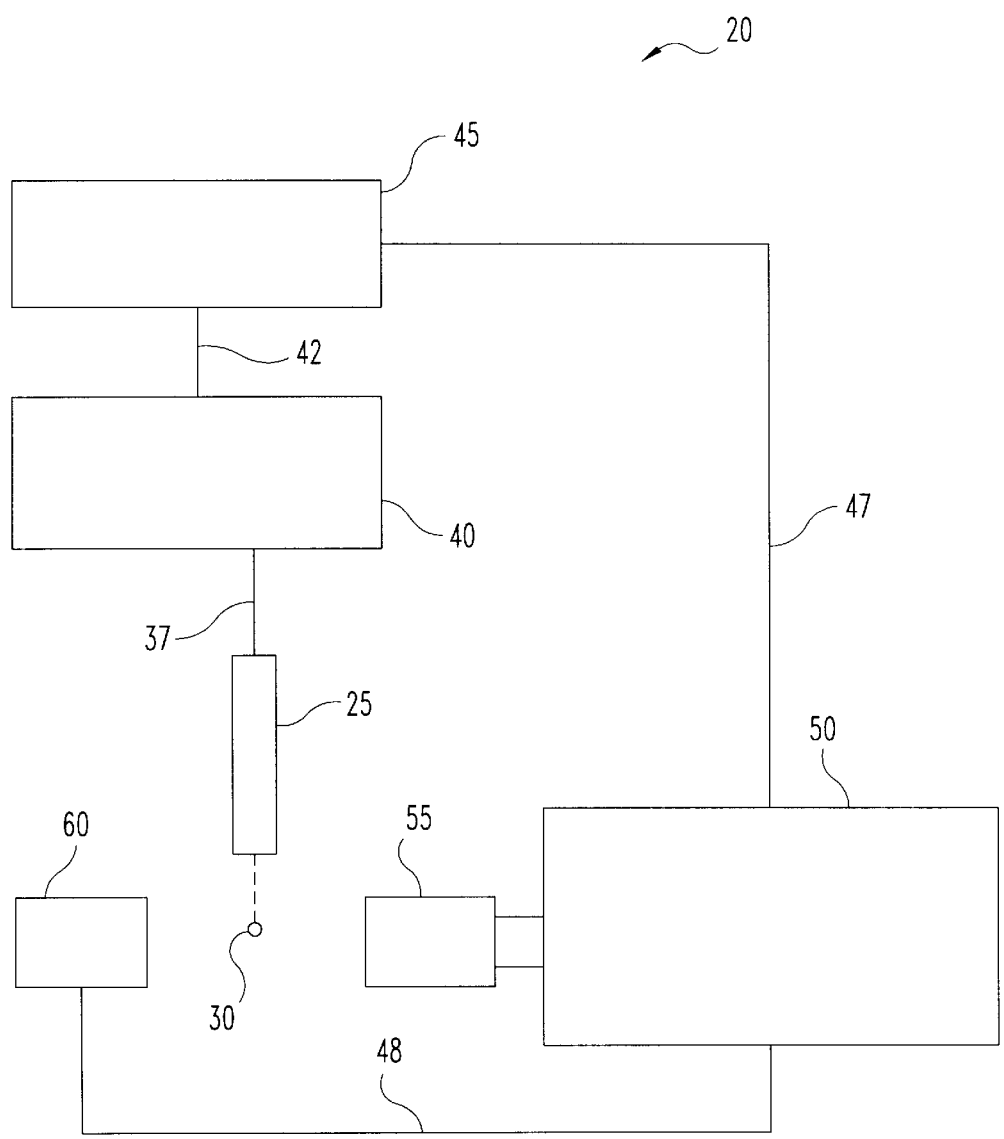
FIG. 1 is a schematic representation of a system for dispensing drops according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention relates to methods and apparatus for producing a drop of fluid from a drop-on-demand (DOD) dispenser. One embodiment of the invention includes a three-portion manipulation of the fluid in the dispenser. Some embodiments of the invention permit dispensing of a drop with a radius smaller than the radius of the dispenser orifice, whereas other embodiments of the present invention permit dispensing of a drop from high viscosity fluids that heretofore could not be dispensed at all, or could be dispensed only from dispensers with a large exit orifice.

The three-portion manipulation of the fluid includes a first portion during which the fluid is withdrawn in a first direction from the orifice toward the interior of the dispenser body. This first period of withdrawal is followed by a second, shorter duration period in which the fluid is propelled in a second, opposite direction from the interior of the dispenser toward the dispenser orifice. This period of propelling is followed by a second withdrawal of the fluid in the first direction toward the interior of the dispenser body.

This invention includes the discovery that by manipulating the fluid generally as described, it is possible to create a small, higher velocity core of fluid roughly centered in the ejection passageway. This small core of fluid has a velocity direction toward the orifice and a velocity magnitude generally greater than the velocity in the annulus of fluid surrounding the core. This small core of higher velocity fluid can express itself as a small external tongue of fluid which extends from the meniscus of the fluid in the passageway. The second withdrawal of the fluid further increases the velocity gradient of the fluid within the passageway, and also acts to retract the meniscus toward the interior of the dispenser, or hold the meniscus generally static. The result of the retraction or holding of the meniscus is to prevent a large drop from exiting the orifice. However, the extending tongue of high velocity core fluid breaks off from the meniscus as a small drop.

Another embodiment of the present invention relates to the three-portion manipulation of high viscosity fluids. In this embodiment, the fluid is withdrawn for a first duration of time in a first direction from the ejection orifice in the passageway toward the interior of the dispenser. Following this period of withdrawal, the fluid in the passageway is propelled for a second, shorter duration of time in a second, opposite direction toward the ejection orifice. Following this period of propelling, the fluid is withdrawn in the first direction a second time for a third duration of time longer than the second. This three-portion manipulation results in the ejection of a large drop of high viscosity fluid. With certain high viscosity fluids there may not be any formation of a small tongue of fluid which subsequently breaks as a drop. However, there is a general bulging and convex extension of the meniscus outside of the ejection orifice, which subsequently separates as a large drop.

The present invention permits the use of DOD dispensers in applications requiring smaller drop resolution, and also in applications requiring ejection of high viscosity. For example, in applications such as ink-jet printing, painting, surface coating (such as for TV picture tubes and cathode ray tubes), and solder dispensing. The present invention permits dispensing of drops that are about one-half or less the diameter of the ejecting orifice. This smaller drop size can be used to provide increased resolution of the ejected fluid onto the receiving surface. Some embodiments of the present invention eject drops that are one-third the diameter of the ejecting orifice. In these applications the quantity of material ejected is one-ninth, or about an order of magnitude smaller than the quantity of fluid ejected with present methods.

The present invention also permits ejection of high viscosity fluids that are currently not considered candidates for DOD dispensing, or are only used with large orifice DOD dispensers. For example, the present invention should be useful with DNA solutions and reagents and solvents containing nucleotide monomers, oligonucleotides, and other biologically active molecules or material. The present invention permits high resolution dispensing of liquids used in combinatorial synthesis applications.

The method of fluid manipulation described herein was discovered by the use of an experimental technique that included high speed imaging of drops emanating from a DOD dispenser. FIG. 1 is a schematic representation of a system 20 for producing drops from a DOD dispenser and taking photographs of those drops as the emanate from the dispenser ejection orifice.

System 20 includes a piezoelectric drop-on-demand dispenser 25 which is actuatable in response to the receipt of an electrical control signal 37 from piezoelectric driver 40. For the results presented herein, the DOD dispenser is a "squeeze-mode" dispenser manufactured by Packard Biosystems. Piezoelectric driver 40 is an A.A. Labs model A-303 high voltage amplifier capable of producing voltage levels up to about ±200 volts at slew rates greater than 200 volts/microsecond.

Piezoelectric driver 40 produces control signal 37 in response to input signal 42 from function generator 45. Function generator 45 is an HP33120A synthesized function generator with built-in arbitrary waveform capability, including the capability of producing 15 MHz output signals.

Function generator 45 is triggered to produce output signal 42 in response to trigger signal 47 from camera/sequencer 50. Camera/sequencer 50 is a Cordin 220-8 ultra high-speed digital camera1 capable of recording 8 separate frames at a frame rate of 100 million frames per second. Camera/sequencer 50 also includes an on-board sequencer which can trigger up to 16 external events with TTL signals. A visual image is provided to camera/sequencer 50 by a Questar QM100 lens, which is a long distance microscope with optical resolution of 1.1 micrometers at a distance of 15 centimeters. Camera/sequencer 50 also provided a trigger signal 48 to a photo flash 60 for illumination of the drop 30 ejected by dispenser 25.

Figure 2:
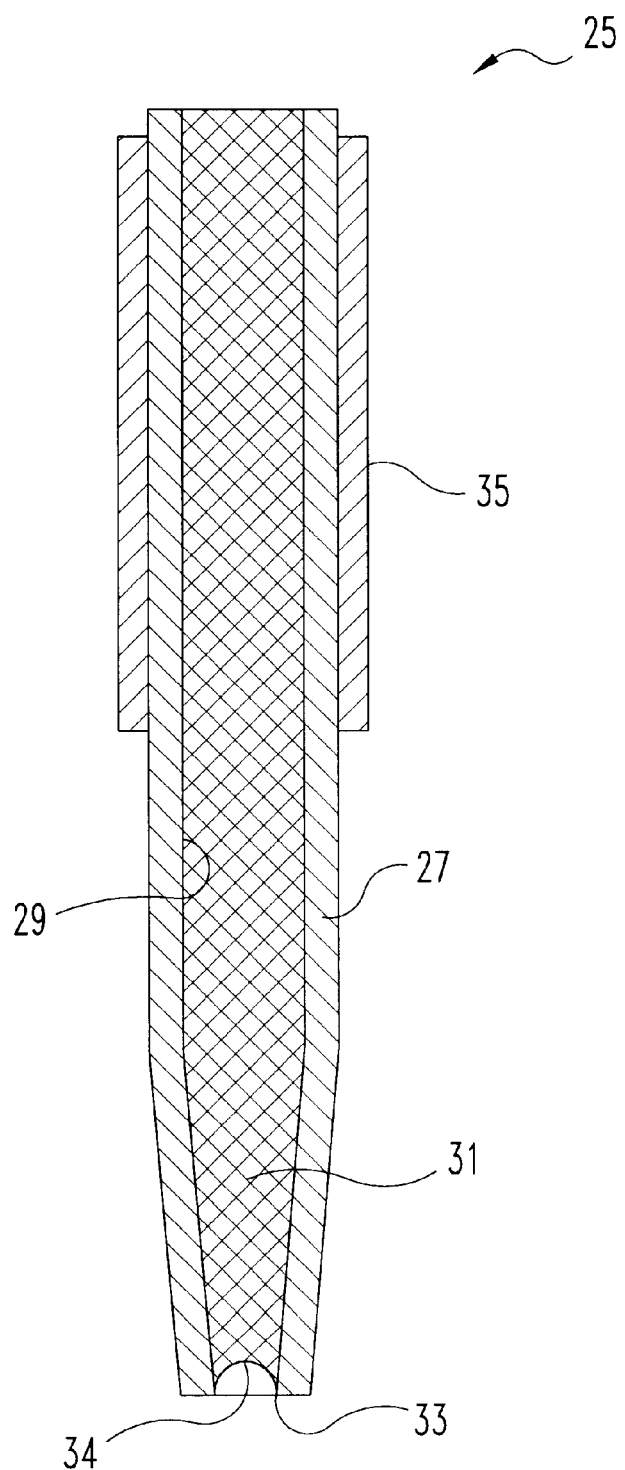
FIG. 2 is a cross-sectional schematic representation of the piezoelectric dispenser, for the system of FIG. 1.

FIG. 2 is a cross-sectional view of DOD dispenser 25. Dispenser 25 includes a glass body 27 defining an internal capillary passageway 29. Passageway 29 contains a reservoir of fluid 31 to be ejected. Drops of fluid are ejected from the ejection orifice 33. Orifice 33 has a diameter of about 70 micrometers. A fluid meniscus 34 forms within passageway 29. A cylindrical piezoelectric element 35 surrounds a portion of the outer diameter of body 27. Upon receipt of a control signal 37, piezoelectric element 35 can be actuated to expand and enlarge the inner diameter of passageway 29 so as to move fluid near ejection orifice 33 in a direction away from the orifice and into the passageway, or generally in the upward direction for the dispenser as shown in FIG. 2. Further, upon receipt of a control signal of the opposite polarity, piezoelectric element 35 squeezes body 27 so as to contract and reduce the inner diameter of passageway 29, with the resultant propelling of fluid 31 toward orifice 33, or in the downward direction as shown in FIG. 2. Although a "squeeze-mode" DOD dispenser has been shown and described, the present invention is equally applicable to "roof shooter" and "side shooter" configurations of DOD dispensers.

Figure 3:
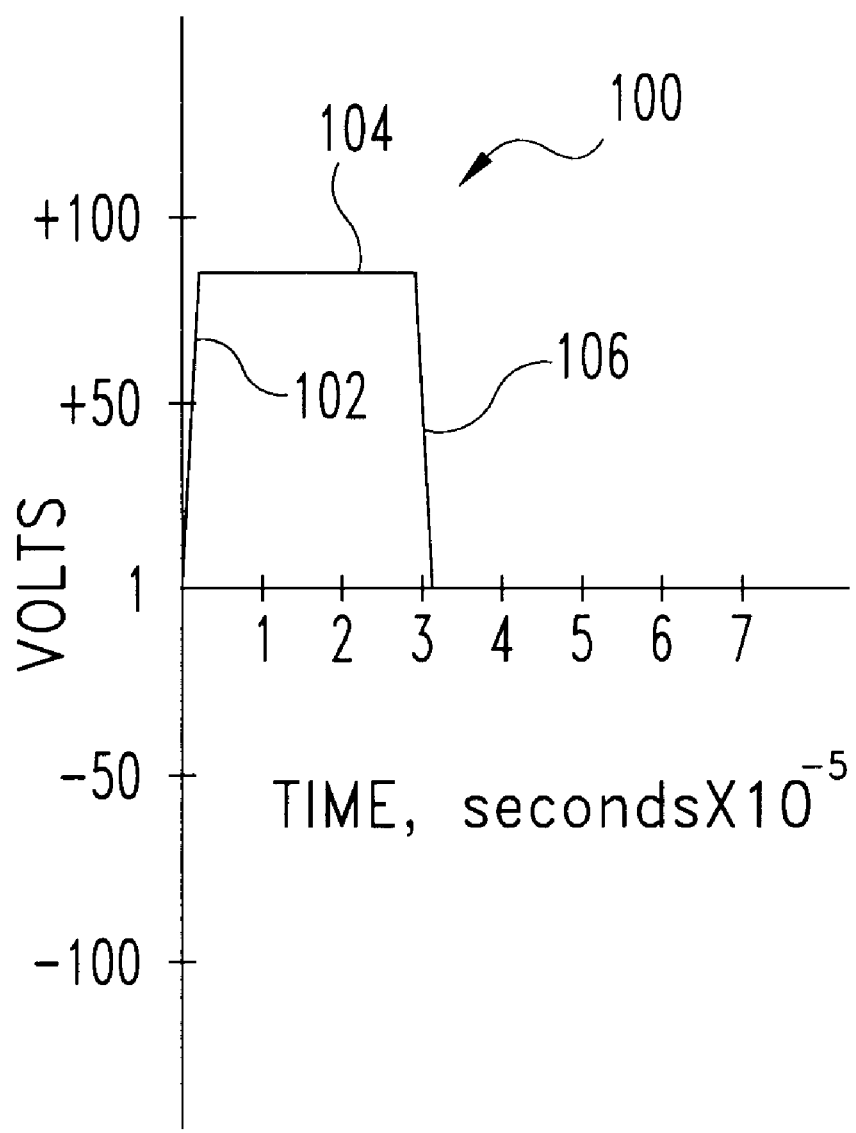
FIG. 3 is a graphical representation of a currently used control signal.

FIGS. 3–9 depicts control signals and resultant photographic sequences using currently used control signals and methods. FIG. 3 graphically represents a Type 1 waveform 100 applied as a control signal to piezoelectric dispenser 25. As used herein, a Type 1 waveform includes a one portion control signal, the one portion being of a single polarity. A Type 2 waveform includes two portions of control signal, a first portion followed by a second portion, the two portions being of different polarities. A Type 3 waveform comprises three portions of control signal, the first and third portions being of the same polarity and the second, intermediate portion being of the opposite polarity. Type 1 and 2 waveforms relate to waveforms currently in use, and Type 3 waveforms relate to various embodiments of the present invention.

Although the control signals are described in terms of polarity, the present invention more generally contemplates portions of controls signals which are adapted and configured to produce responses of the fluid in the dispenser. For example, the Type 3 waveforms shown herein includes first and third portions adapted and configured for withdrawing fluid in a direction from the orifice toward the passageway, and a second portion adapted and configured for propelling fluid in a direction from the passageway toward the orifice. For the particular dispenser used herewith, the first and third portions of the control signal had negative polarities, and the second portion has a positive polarity. However, the present invention also contemplates those embodiments with opposite polarities, as well as embodiments in which the control signal produces the desired withdrawing or propelling effect even though a polarity cannot be assigned to either effect.

FIG. 3 graphically depicts a Type 1 waveform 100 which comprises a leading edge 102, a dwell section 104, and a trailing edge 106. Waveform 100 is of a polarity that acts to place piezoelectric element 35 in compression, with a resultant propelling of fluid 31 toward ejection orifice 33. The particular values for waveform 100 are shown in Table 1, which shows that a maximum of 86 volts is applied to piezoelectric element 35 for a duration of 32 microseconds. Although particular values for waveform time and voltage are shown and described herein for various control signals, the present invention contemplates other selections of time and voltage chosen for different types of piezoelectric dispensers, dispenser orientations, and fluid types.

Figure 4:
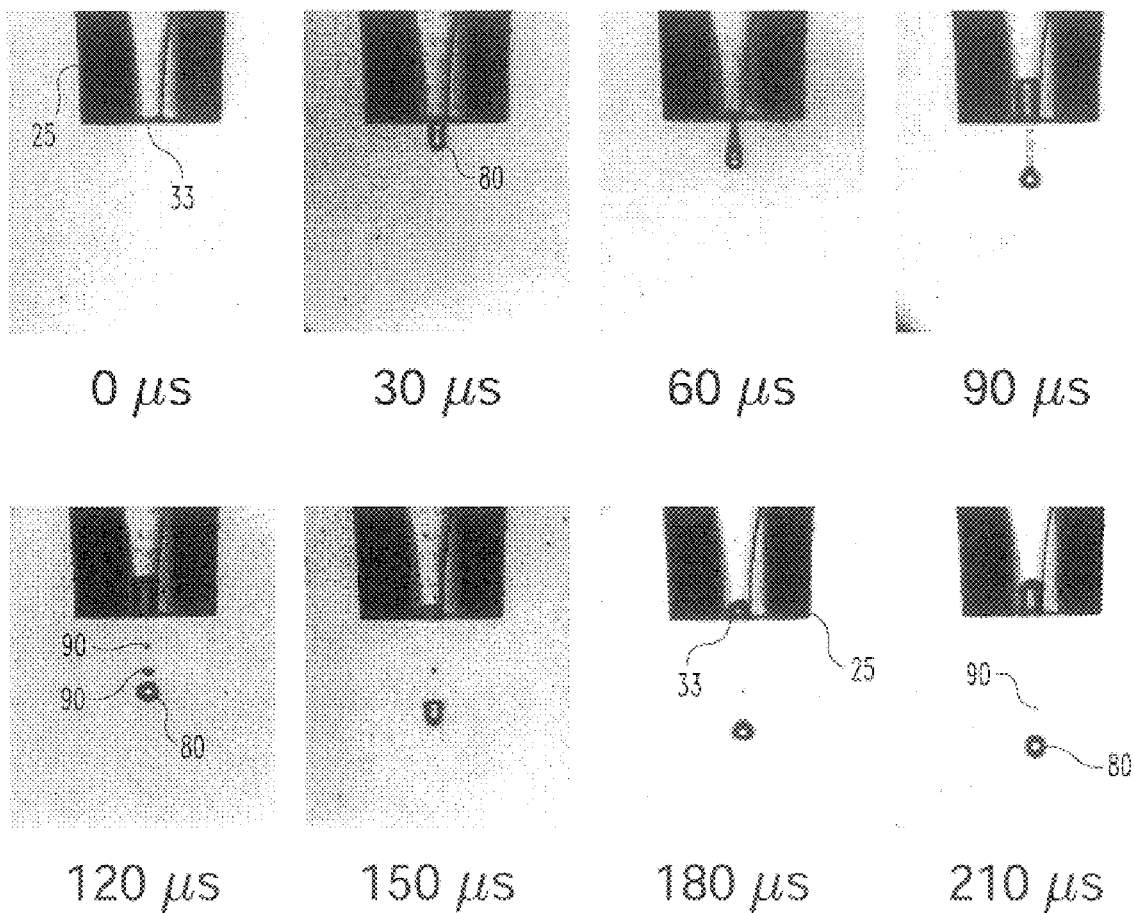
FIG. 4 is a timed sequence of photographs showing the response of the piezoelectric dispenser to the control signal of FIG. 3, using water as a fluid.

FIG. 4 is a timed sequence of photographs takes by apparatus 20, using water as the fluid and waveform 100 as the control signal. The legend beneath each photograph indicates the time elapsed in microseconds since the beginning of waveform 100. Note that at 30 microseconds, or shortly before application of trailing edge 106, a large drop 80 is extending from ejection orifice 33 of dispenser 25. At 90 microseconds, the drop is separated from dispenser 25. At 120 microseconds, a large drop 80 is moving away from dispenser 25, followed by two satellite drops 90. As can be seen at 150, 180, and 210 microseconds, only a single satellite 90 remains, the other satellite drop having coalesced with large drop 80.

Figure 5:
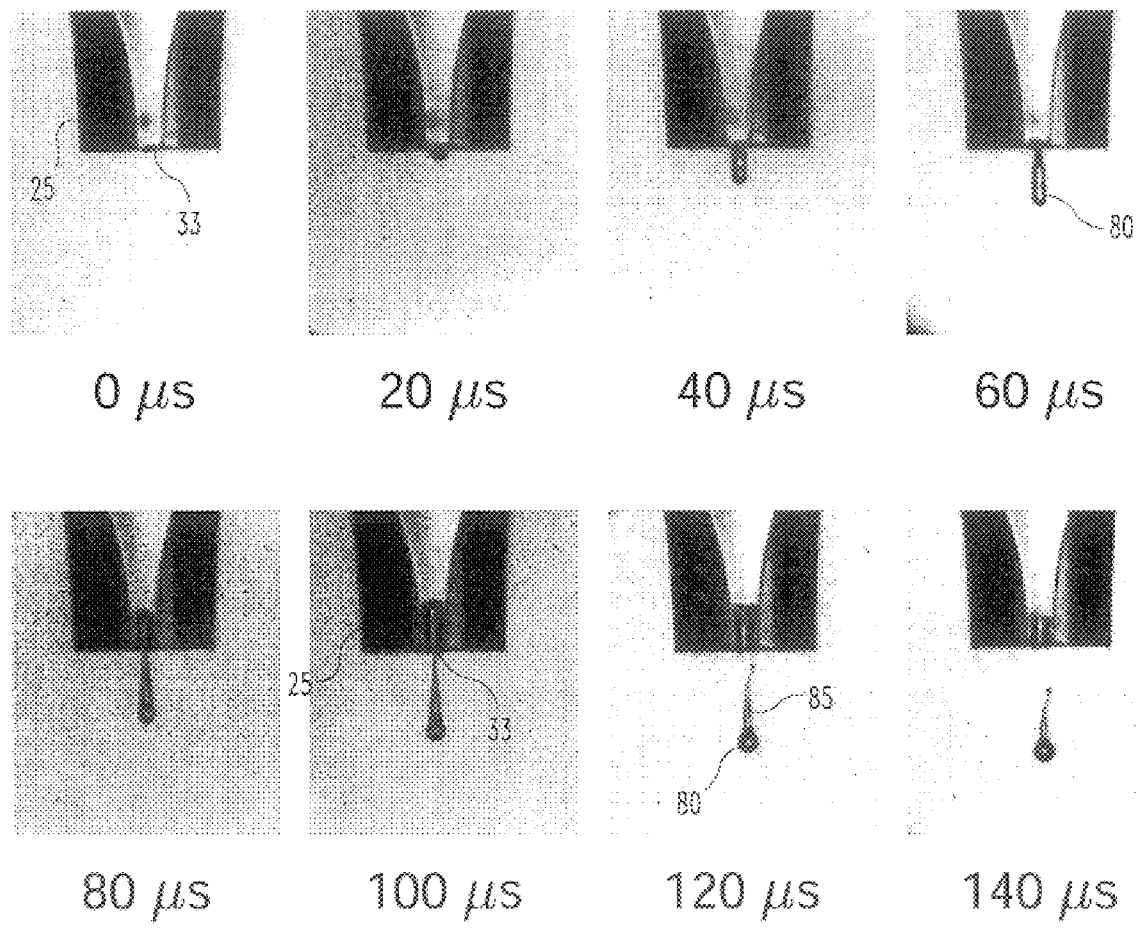
FIG. 5 is a timed sequence of photographs showing the response of the piezoelectric dispenser to the control signal of FIG. 3, using 50% water and 50% glycerol as a fluid.

FIG. 5 is a timed sequence of photographs taken by system 20 using a fluid of 50% water/50% glycerol, with dispenser 25 receiving waveform 100. As compared with FIG. 4, the large drop 80 of FIG. 5 extends from orifice 33 at a later point in time. Further, as seen best at 120 microseconds, large drop 80 is highly asymmetric, including a large tail 85.

Figure 6A:
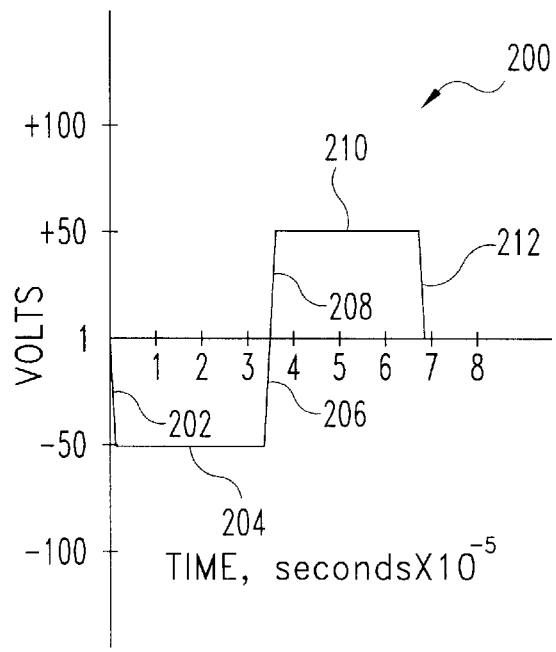
FIG. 6A is a graphical representation of a currently used control signal.
Figure 6B:
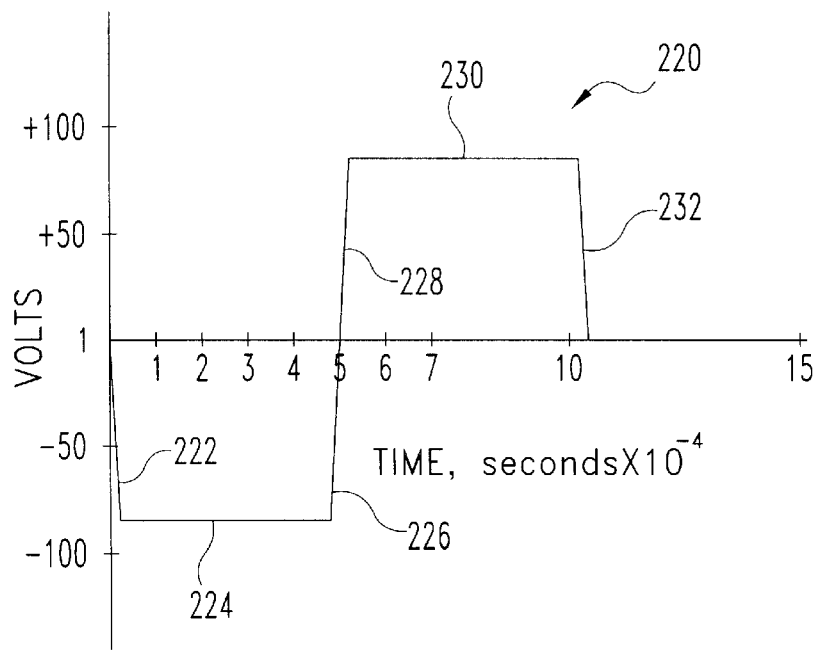
FIG. 6B is a graphical representation of a currently used control signal.

FIGS. 6A and 6B depict Type 2 waveform control signals 200 and 220, respectively. Each waveform 200 and 220 include a first portion with a first polarity followed by a second portion with the opposite polarity. The first portion of waveform 200 comprises leading edge 202, dwell section 204, and trailing edge 206. As indicated in Table 2.0, dwell section 204 is about −48 volts for a period of about 35.5 microseconds. The polarity of the first portion of waveform 200 acts to expand piezoelectric element 35 so as to withdraw fluid into passageway 29 from ejecting orifice 33. The second portion of waveform 200 includes leading edge 208, dwell section 210 and trailing edge 212. Waveform 220, including a first portion comprising leading edge 220, dwell section 224 and trailing edge 226; and a section portion of opposite polarity comprising leading edge 228, dwell section 230 and trailing edge 232, is shown graphically in FIG. 6B, with tabular values provided in Table 2.2.

Figure 7:
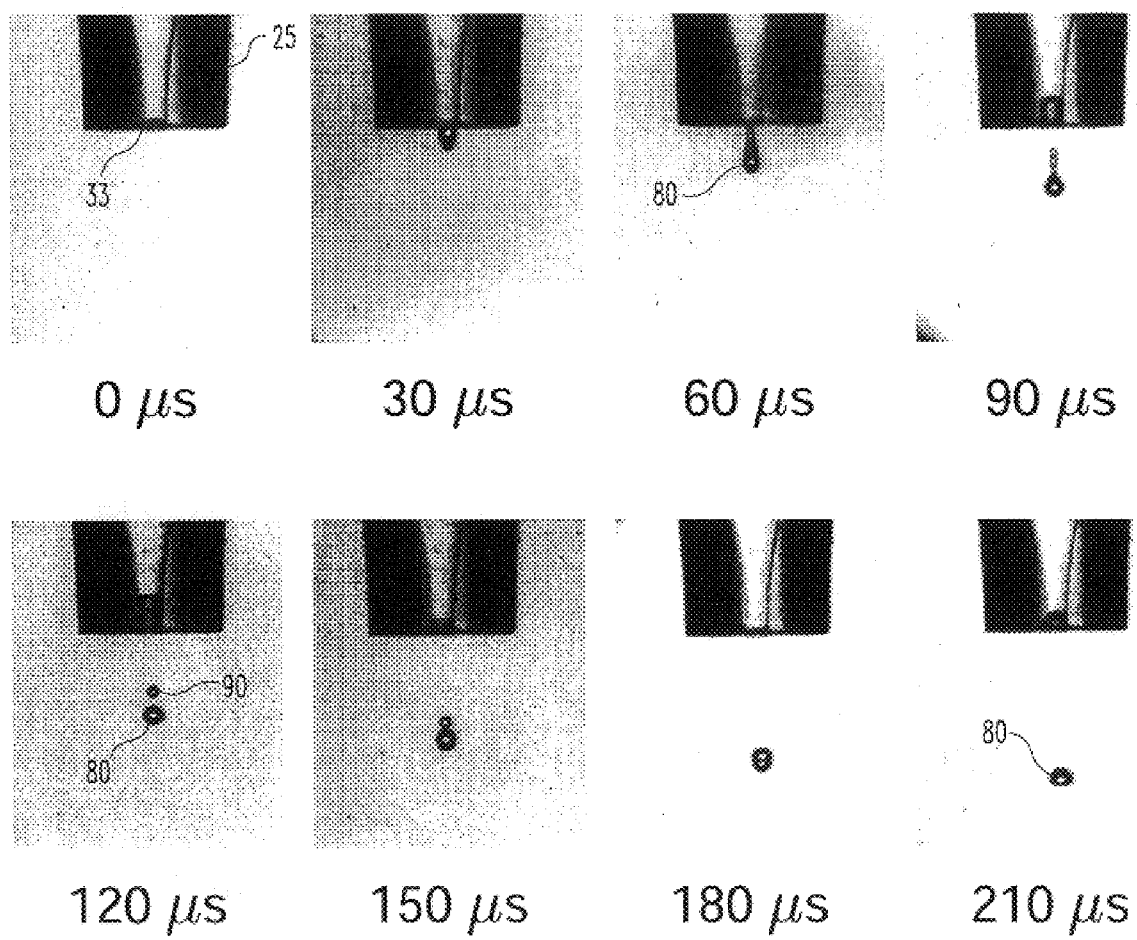
FIG. 7 is a timed sequence of photographs showing the response of the piezoelectric dispenser to the control signal of FIG. 6A, using water as a fluid.

FIG. 7 shows a timed sequence of photographs which begin with the onset of waveform 200 at 0 microseconds. As compared with FIG. 4, note that fewer satellite drops 90 are present at 120 microseconds, and that the single satellite drop shown has coalesced into the large drop 80 by 210 microseconds. In addition, at 210 microseconds the large drop 80 of FIG. 7 is almost 4.5% farther from orifice 33 indicating a drop velocity increase of about 4.5%.

Figure 8A:
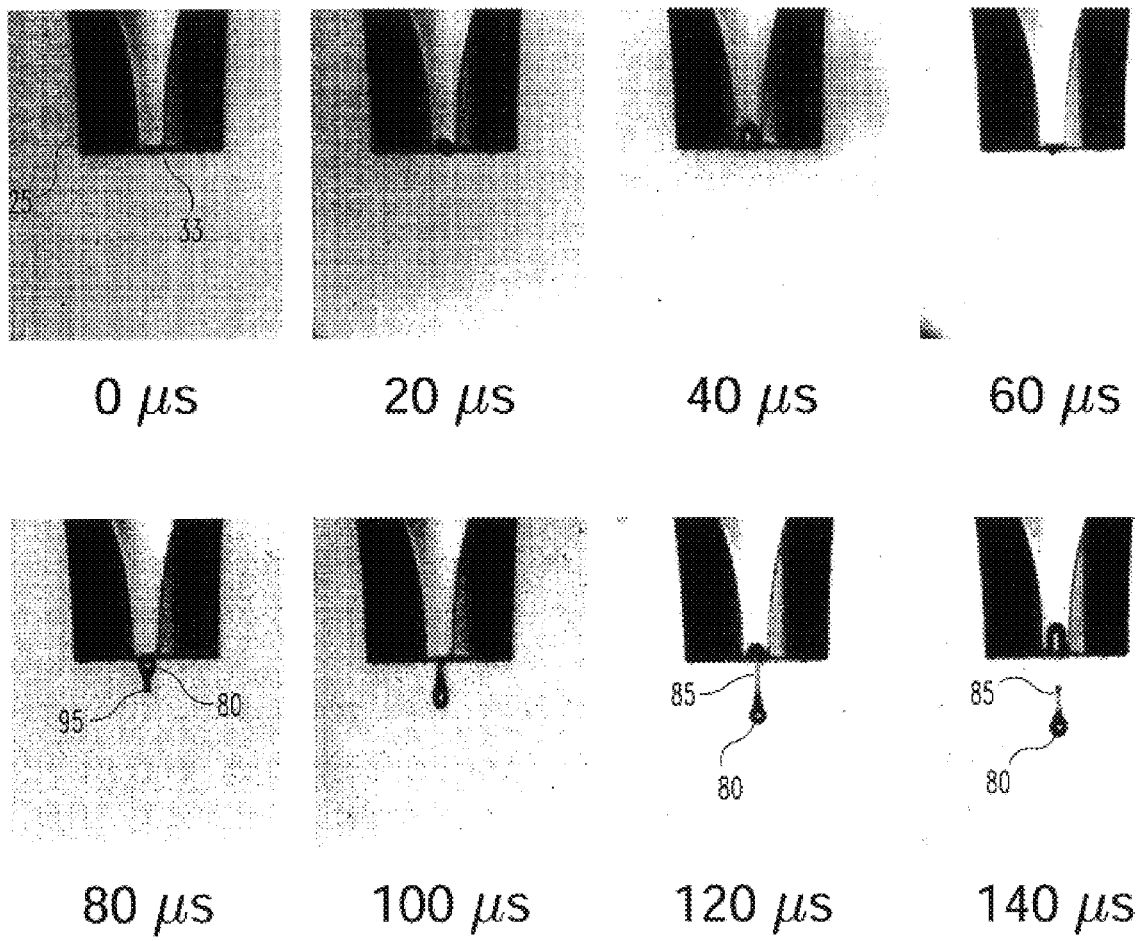
FIG. 8A is a timed sequence of photographs showing the response of the piezoelectric dispenser to the control signal of FIG. 6A, using 50% water and 50% glycerol as a fluid.
Figure 8B:
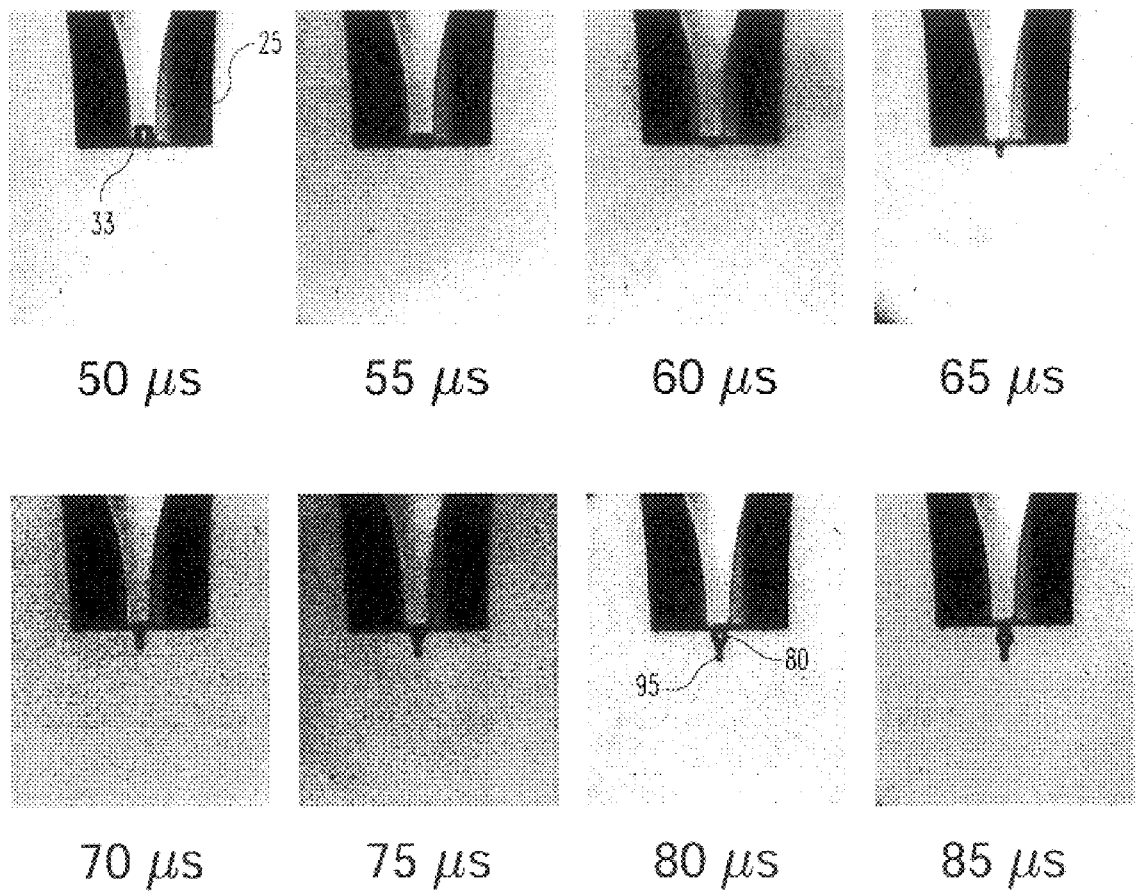
FIG. 8B is a timed sequence of photographs showing the response of the piezoelectric dispenser to the control signal of FIG. 6A, using 50% water and 50% glycerol as a fluid.

FIGS. 8A and 8B are time-sequenced photographs showing the ejection of a drop of fluid comprising 50% water and 50% glycerol. Control signal 200 was used to actuate dispenser 25. The photographs of FIG. 8A span a time from 0 to 140 microseconds, and the photographs of 8B span a time from 50 to 85 microseconds. As compared with FIG. 5, the drop 80 at 120 microseconds in FIG. 8A shows a small tail 85 as compared to the tail shown at the same time in FIG. 5. Further, drop 80 at 120 microseconds in FIG. 8A is virtually axisymmetric. At 80 microseconds, a large drop 80 is extending ejection orifice 33, and a small tongue 95 extends generally from the center of large drop 80. As can be seen at 85 microseconds and 100 microseconds, the tongue 95 is subsumed within large drop 80.

Figure 9:
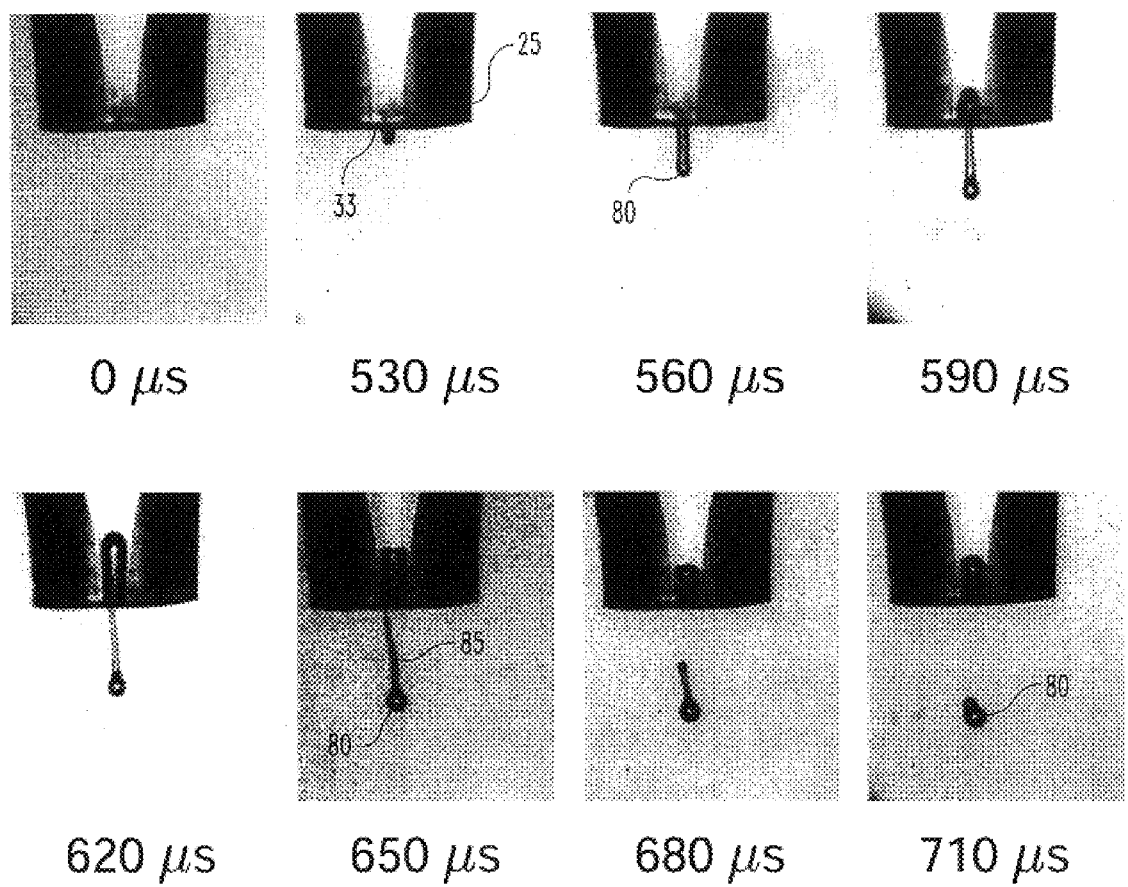
FIG. 9 is a timed sequence of photographs showing the response of the piezoelectric dispenser to the control signal of FIG. 6A, using 38% water and 62% glycerol as a fluid.

FIG. 9 shows a timed sequence of photographs for the application of signal 200 to system 20, with the fluid being 38% water and 62% glycerol. Note that because of the high viscosity, no significant fluid emerges from orifice 33 until about 530 microseconds after the beginning of waveform 200. As can be seen in 650 microseconds, a large asymmetric tail 85 extends from large drop 80.

Figure 10A:
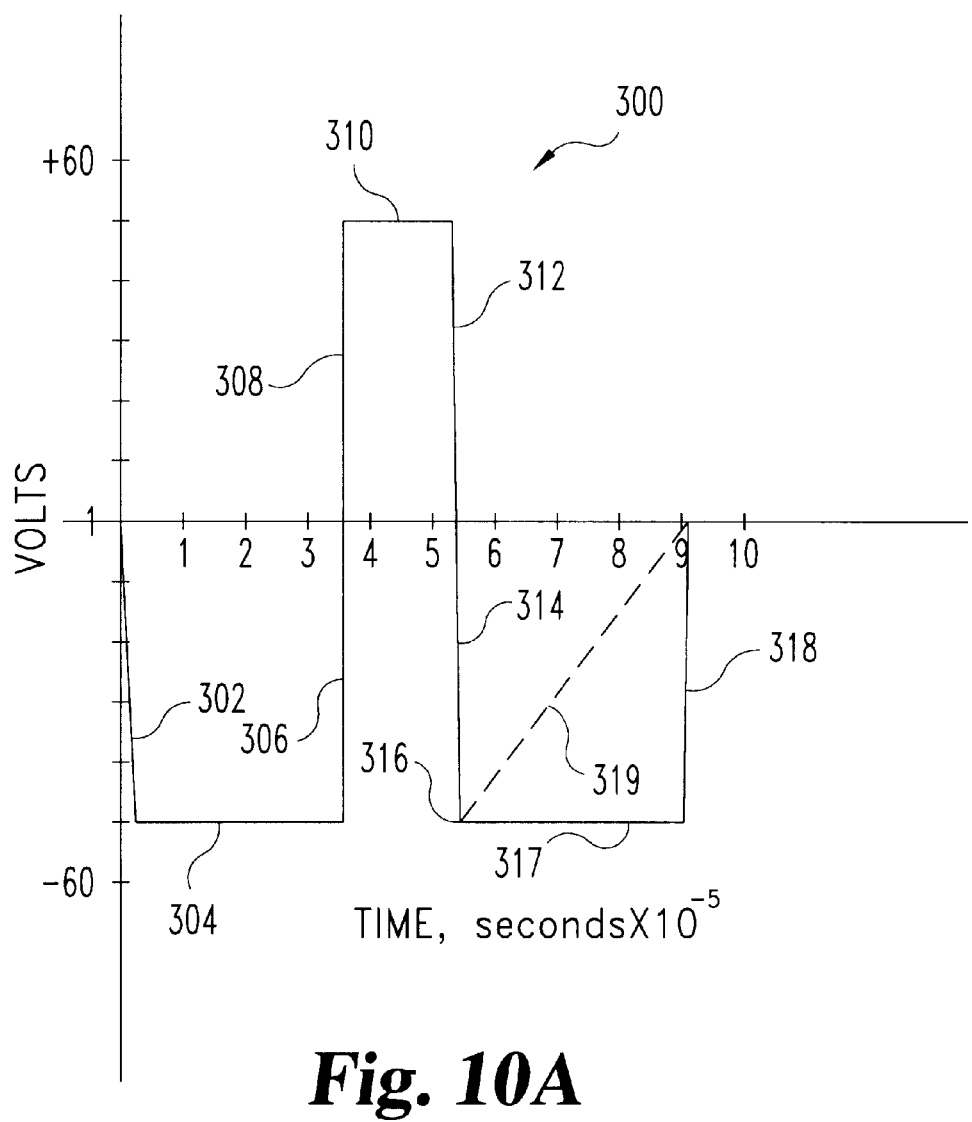
FIG. 10A is a control signal for a piezoelectric dispenser according to one embodiment of the present invention.
Figure 10B:
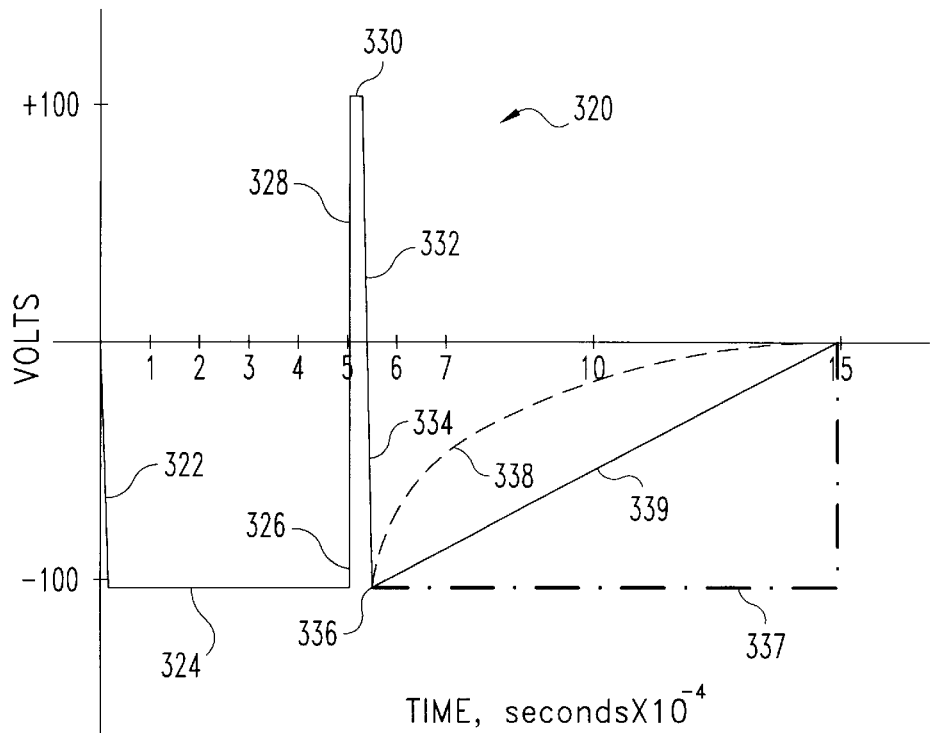
FIG. 10B is a control signal for a piezoelectric dispenser according to another embodiment of the present invention.
Figure 10C:
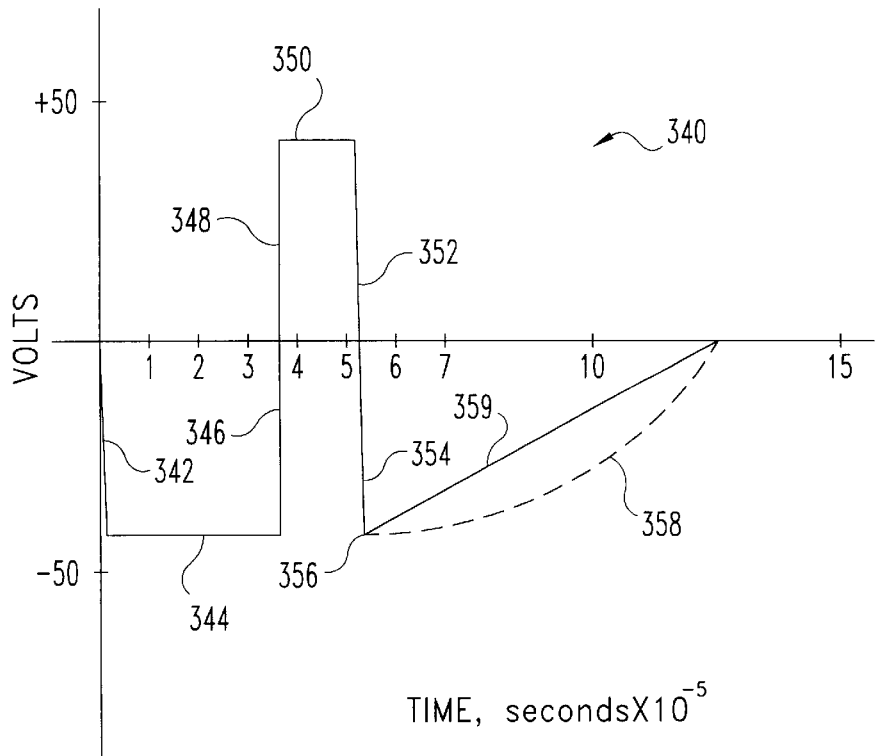
FIG. 10C is a control signal for a piezoelectric dispenser according to another embodiment of the present invention.
Figure 11:
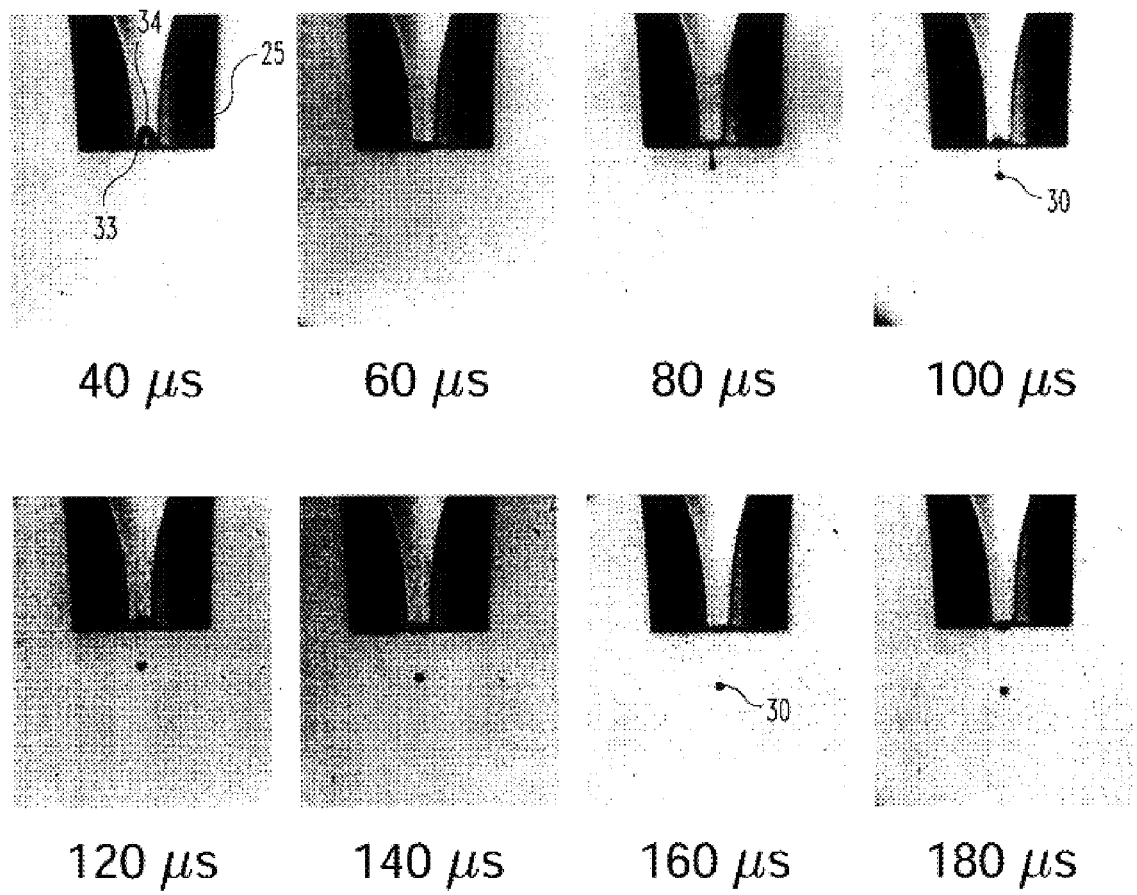
FIG. 11 is a timed sequence of photographs showing the response of the piezoelectric dispenser to the control signal of FIG. 10B, using 50% water and 50% glycerol as a fluid.
Figure 12:
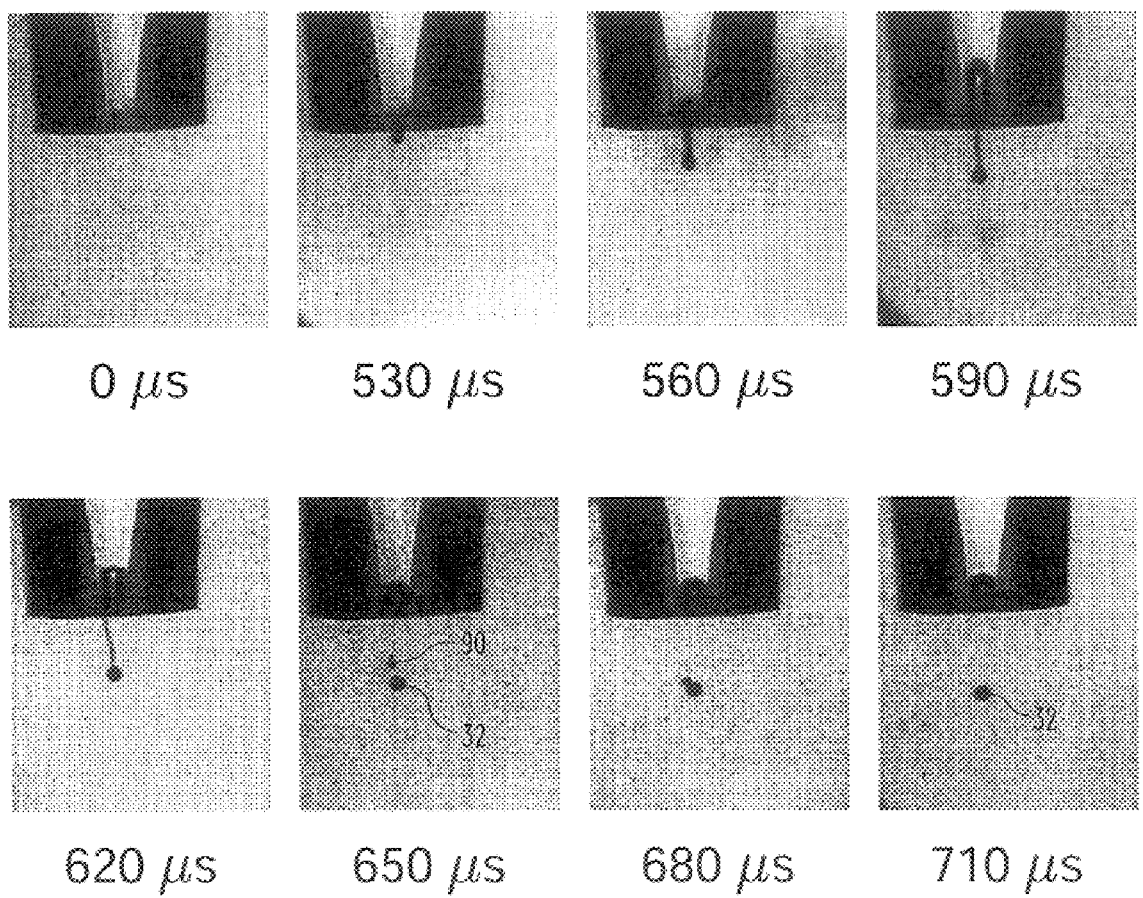
FIG. 12 is a timed sequence of photographs showing the response of the piezoelectric dispenser to the control signal of FIG. 10B, using 38% water and 62% glycerol as a fluid.
Figure 13:
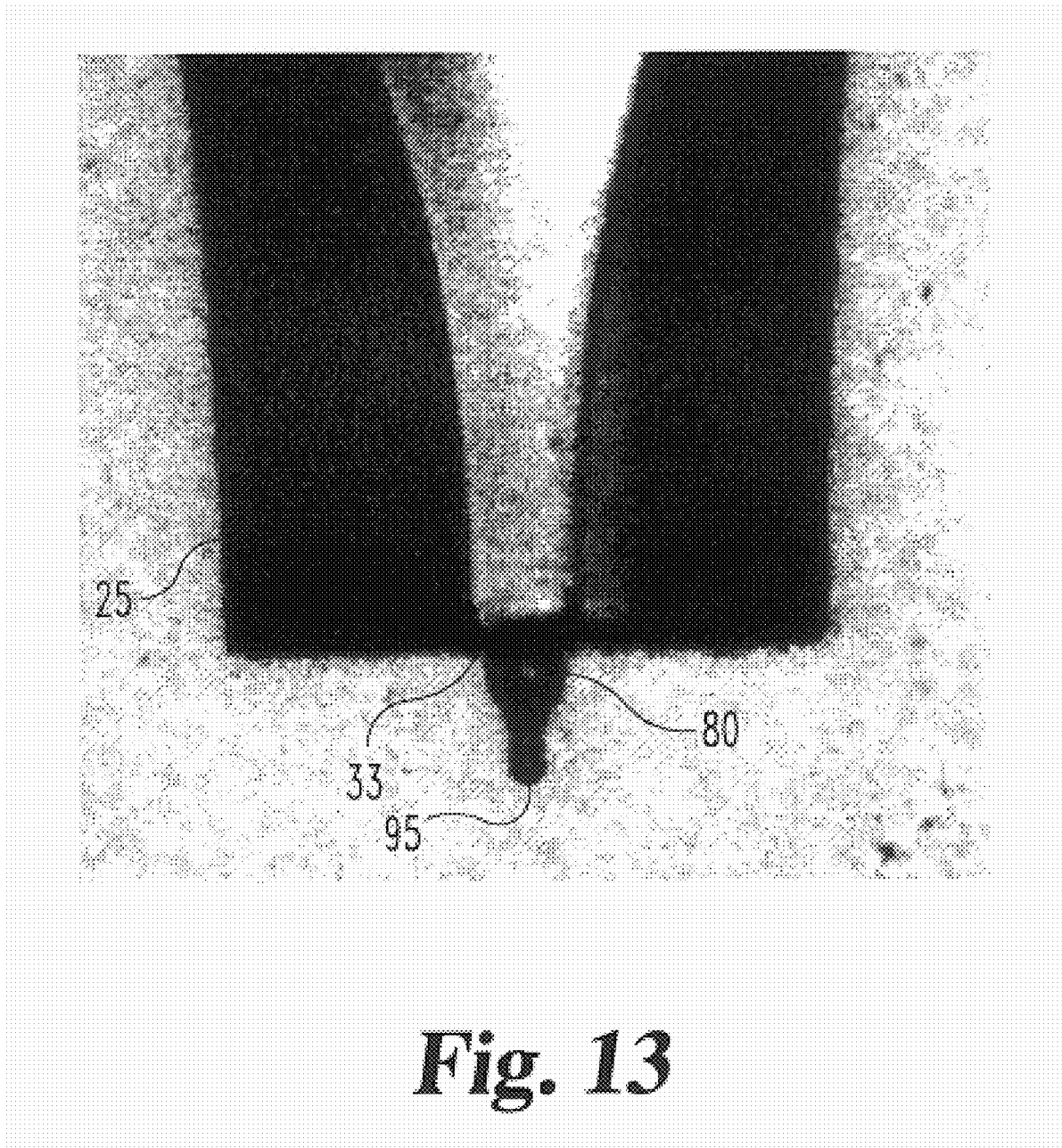
FIG. 13 is photograph of fluid dispensing from a piezoelectric dispenser.
Figure 14:
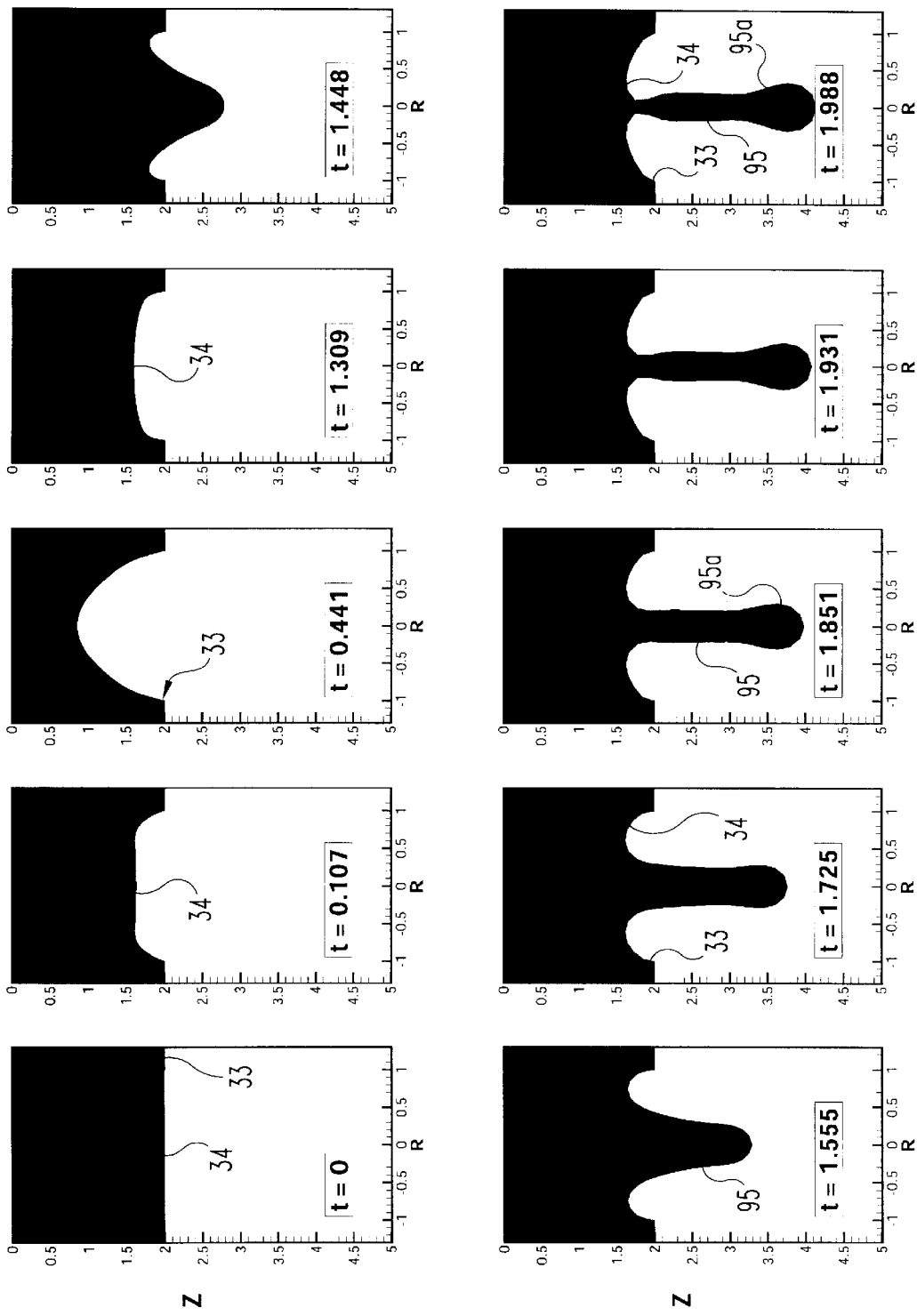
FIG. 14 is a sequence of cross sectional graphical representations of analytical predictions for the response of fluid in a piezoelectric dispenser according to one embodiment of the present invention.
Figure 15:
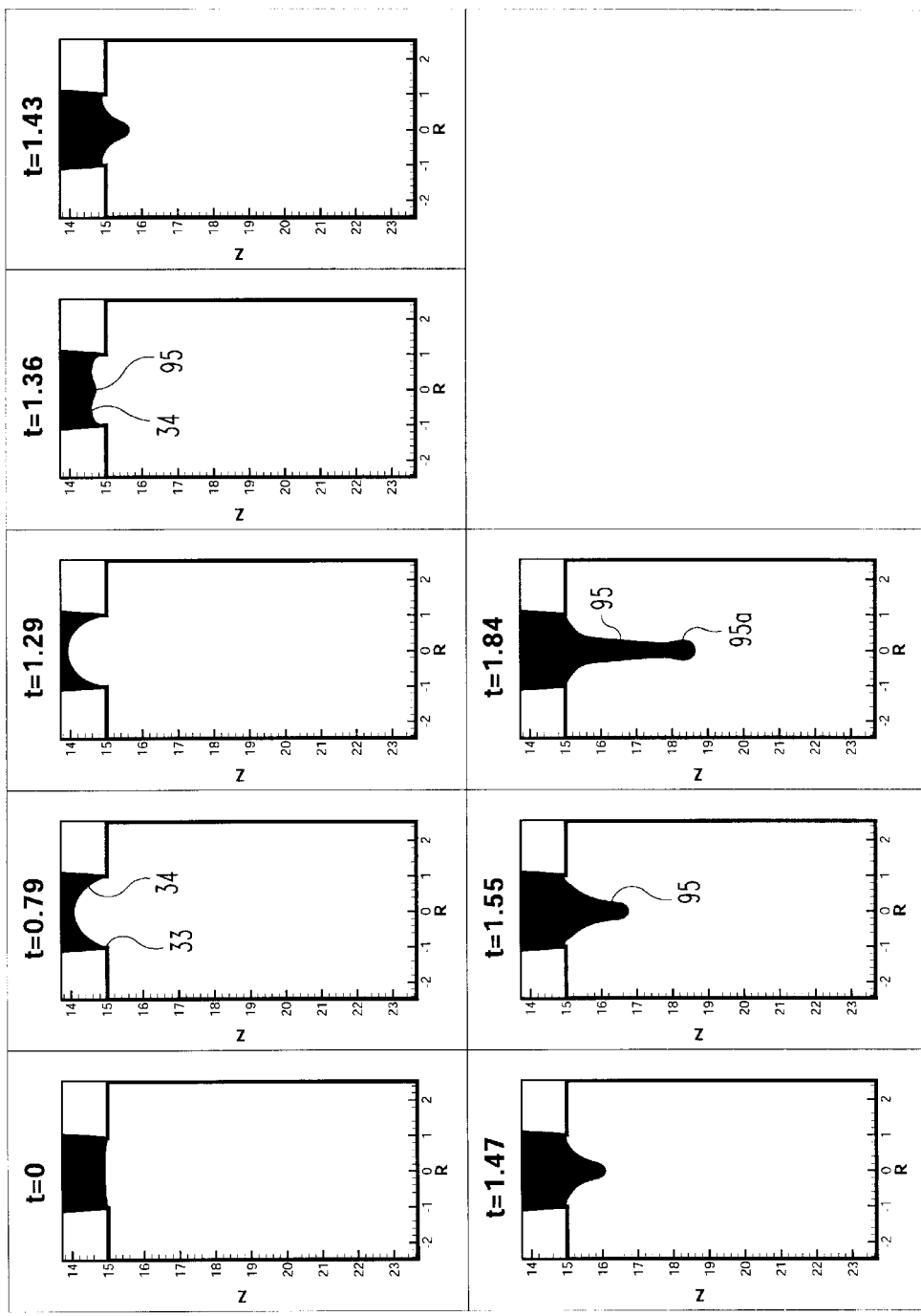
FIG. 15 is a sequence of cross sectional graphical representations of analytical predictions for the response of fluid in a piezoelectric dispenser according to one embodiment of the present invention.
Figure 16:
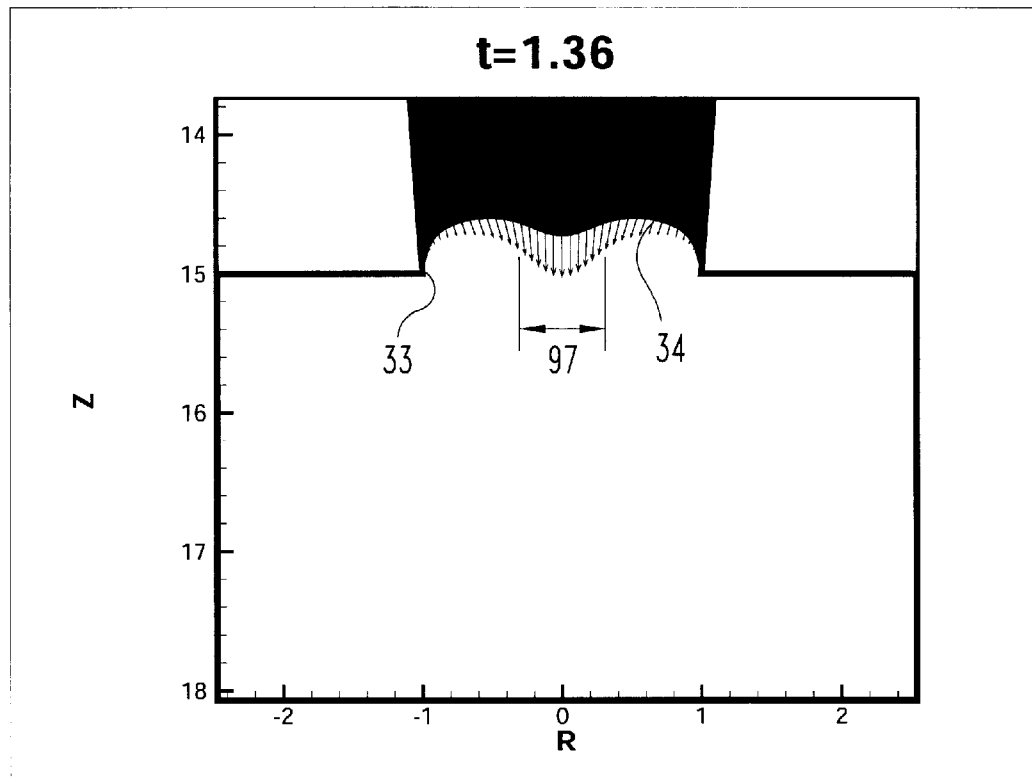
FIG. 16 is a graphical representation of the velocity profile at the meniscus for one of the graphical representations of FIG. 15.

FIGS. 10A, 10B, and 10C depict Type 3 waveform control signals 37, waveforms 300, 320, and 340, respectively, according to various embodiments of the present invention. FIGS. 11, 12, and 13 depict timed sequence photographs showing the formation of drops according to various embodiments of the present invention in response to a Type 3 waveform. FIGS. 14, 15, and 16 depict analytical predictions of the response of fluid near the orifice according to various embodiments of the present invention in response to a Type 3 waveform.

Waveform 300 of FIG. 10A includes three parts. A first portion of a first polarity comprises a leading edge 302, a dwell section 304, and a trailing edge 306. The first portion of a Type 3 waveform withdraws the fluid away from the orifice and in toward the passageway. The meniscus of the fluid is thereby moved away from any defects that may exist near the orifice, including for example manufacturing defects and dried fluid deposits. Also, the first portion of the Type 3 waveform creates more consistent conditions within the fluid, which improves the consistency of effects from the second and third portions.

Following the first portion of control signal 300 is a second portion of a second, opposite polarity comprising a leading edge 308, dwell section 310 and trailing edge 312. Control signal 300 also includes a third portion of the same polarity as the first part. The third portion of control signal 300 comprises a leading edge 314 and a peak voltage 316. As shown graphically in FIG. 10A, some embodiments of the present invention further include a dwell section 317 and a trailing edge 318, wherein trailing 318 has a rise time that is about the same as the rise time of leading edge 314. However, a more preferred embodiment includes a trailing edge 319 with a rise time that is significantly slower than the rise time of leading edge 314. As shown in FIG. 10A, trailing edge 319 ramps linearly from peak voltage 316 back to a neutral position for element 35 at 0 volts.

As can be seen graphically in FIG. 10A, and also quantitatively in the tabular values of Table 3.0, the duration of the second portion of waveforms 300, 320, and 340, as measured as the time above the neutral state of 0 volts, is preferably shorter than either the duration of the first portion of control signal 300 or the duration of the third portion of control signal 300. Roughly, the duration of the second or propelling portion of control signal 300 is about one-half the duration of the first withdrawing portion. Further, the duration of the propelling portion is about one-half of the duration of the second withdrawing portion, as measured from leading edge 314 until the signal returns to a neutral position. It has been discovered that having a shorter propelling duration following a longer first withdrawing portion produces the small tongue 95 extending from either a large drop or convex meniscus still attached to the ejection orifice, or from a concave meniscus attached to the ejection orifice. By following the propelling portion with a the second withdrawing portion, the large drop or convex meniscus attached to and extending from the ejection orifice is either pulled into the passageway or stays generally static at the orifice. Although a waveform with a second propelling portion shorter than each of the withdrawing portions has been shown and described, the present invention also contemplates manipulation of the fluid with a propelling portion shorter than only one of the first withdrawing portion or the second withdrawing portion.

FIG. 13 is a close-up photograph of fluid extending from ejecting orifice 33. A large drop 80 is shown still attached to ejection orifice 33. A small tongue 95 of higher velocity fluid from the core of the passageway is shown extending from drop 80. By appropriately establishing the duration of the propelling portion of the control signal to be shorter than the first withdrawing portion, large drop 80 is kept attached to orifice 33. A second withdrawing portion of control signal 300 then retracts inwardly most of large drop 80, but is insufficient to overcome the inertia of tongue 95, and tongue 95 subsequently separates and forms a small drop 30.

FIG. 11 is a sequence of timed photographs taken by system 20 using waveform 300 as control signal 37, with a fluid comprising 50% water and 50% glycerol, and having a viscosity of about 5 centipoises. At 40 microseconds, the meniscus 34 has retracted into the passageway. At 80 microseconds, a small tongue is shown extending from meniscus 34. At 100 microseconds tongue 95 has separated and formed a small drop 30 according to one embodiment of the present invention is shown being ejected.

FIG. 12 is a sequence of timed photographs showing the ejection of a drop from dispenser 25 as a result of using waveform 320 as control signal 37, using a fluid comprising 38% water and 62% glycerol, and having a viscosity of about 10 centipoises. Comparing the photographs of FIG. 12 and the photographs of FIG. 9, note that FIG. 12 shows the ejection of a drop 32 at 710 microseconds that is significantly smaller and more symmetric than the drop 80 shown at the same time in FIG. 9. Further, note that at 650 microseconds in FIG. 12 there is a small satellite 90 following drop 32, which later coalesces into drop 32. In contrast at the same time in FIG. 9, a large tail 85 still connects drop 80 to orifice 33.

FIG. 10B depicts a waveform 320 useful as control signal 37 according to another embodiment of the present invention. Tabular values for waveform 320 are provided in Table 3.2. Waveform 320 includes a first portion with a polarity adapted and configured for withdrawing fluid within the passageway, the first portion comprising leading edge 322, dwell section 324, and trailing edge 326. The first portion is followed by a second portion of waveform 320 adapted and configured for propelling fluid within dispenser 35 toward the ejecting orifice. The second portion comprises a leading edge 328, dwell section 330, and trailing edge 332. Note that the duration of the propelling portion is less than one-tenth the duration of the first withdrawing portion.

After the propelling portion, a second withdrawing portion begins with trailing edge 332 and continues with leading edge 334. The second withdrawing portion includes application of a peak voltage 336 (corresponding to a peak withdrawing force exerted by element 35), followed by a transition back to a neutral position for the piezoelectric driver. As shown in FIG. 10B, a preferred transition from peak voltage 336 to a neutral voltage follows trailing edge transition 339, which is a linear ramp. However, the present invention also contemplates curvilinear transitions such as decaying exponential transition 338. Further, the present invention contemplates a dwell section 337 extending from peak voltage 336, which includes a sharp trailing edge transition back to the neutral state.

FIG. 10C depicts a waveform 340 useful as a control signal 37 according to another embodiment of the present invention. Tabular values for control signal 340 are provided in Table 3.4. Control signal 340 includes a first portion with a polarity adapted and configured for withdrawing fluid within the passageway, the first portion comprising leading edge 342, dwell section 344, and trailing edge 346. The first portion is followed by a second portion of control signal 340 adapted and configured for propelling fluid within dispenser 35 toward the ejecting orifice. The second portion comprises a leading edge 348, dwell section 350, and trailing edge 352. Note that the duration of the propelling portion is less than about one half the duration of the first withdrawing portion. After the propelling portion, a second withdrawing portion begins with trailing edge 332 and continues with leading edge 354. The second withdrawing includes application of a peak voltage 356 or peak withdrawing force, followed by a transition back to a neutral position for the piezoelectric driver. As shown in 10C, a preferred transition from peak voltage 356 to a neutral voltage follows trailing edge transition 359, which is a linear ramp. However, the present invention also contemplates curvilinear transitions such as rising exponential transition 358. Further, the present invention contemplates a dwell section extending from peak voltage 356, which includes a sharp trailing edge transition back to the neutral state.

FIG. 14 is a timed sequence of analytical predictions for the fluid in the vicinity of orifice 33 after the application of a Type 3 control signal according to one embodiment of the present invention. Each of the computer-generated drawings of FIG. 14 shows a close-up and cross-section of passageway 29 in the vicinity of ejection nozzle 33. The quantity "R" represents the distance from the centerline of passageway 29. The quantity "Z" represents the axial distance along the centerline of passageway 29, with a value of Z=2 being the edge of orifice 33. The quantity "t" represents normalized time, in which time has been normalized by a characteristic time, or $t_c$, where:

$$t_c = (\rho R^3 / \sigma)^{1/2}$$

where ρ is the density of the fluid, R is the radius of the orifice, and σ is the surface tension of the fluid. FIGS. 14 and 15 show predictions for a fluid comprising 50% water and 50% glycerol. As shown at t=0, the meniscus 34 is initially even with the edge of orifice 33.

Referring to FIG. 14, at times t=0.107 and t=0.441, the effect of the first withdrawing of fluid can be seen. Meniscus 34 assumes a concave inward shape, and retracts into the passageway of the dispenser. Between t=0.441 and t=1.309, the fluid is being propelled toward orifice 33 in a manner as described previously. Between t=1.309 and t=1.448, the piezoelectric element begins a second withdrawing of the fluid in the passageway. As shown from t=1.448 and thereafter, the second withdrawing is sufficient to keep the edge of the meniscus in a concave-type shape and contained within the passageway.

As can be seen beginning at t=1.448 and continuing thereafter, the propelling portion following the first withdrawing results in the formation of a tongue 95 extending from the center of meniscus 34. A small drop can be seen forming at the tip 95a of tongue 95 at t=1.851. This tip is later ejected as a small drop 32. Tongue 95 continues to extend out of the orifice and eventually separates from meniscus 34 and subsequently forms a drop 30 smaller than the diameter of orifice 33.

The Type 3 waveform used during the simulations shown in FIG. 15 included a first withdrawing portion with a leading edge from t=0 to t=0.03, followed by a dwell section from t=0.03 to t=1.28. The first withdrawing portion transitioned to the propelling portion from t=1.28 to t=1.31. The propelling portion included a dwell section from t=1.31 to t=1.5. The transition to the second withdrawing portion occurred from t=1.5 to t=1.53. The dwell section of the second withdrawing portion extended from t=1.53 until past the last prediction shown to at t=2.51. Note that the duration of the propelling portion is about one sixth the duration of the first withdrawing portion. Also, the duration of the propelling portion is at least less than about one fourth the duration of the second withdrawing portion.

Referring to FIG. 15, from times t=0.0 to t=1.29, the effect of the first withdrawing of fluid can be seen. Meniscus 34 assumes a concave inward shape, and retracts into the passageway of the dispenser. Between t=1.28 and t=1.31, the fluid is being propelled toward orifice 33 in a manner as described previously. A small tongue 95 can be seen beginning to emerge from concave meniscus 34 at time t=1.36. Even though the propelling portion ended at t=1.50, the tongue 95 continues to extend from below the meniscus. At t=1.55 and t=1.84, the piezoelectric element is continuing the second withdrawing of the fluid in the passageway, which does not suppress the tongue, but does suppress formation of a large drop. A small drop can be seen forming at the tip 95a of tongue 95 at t=1.84. This tip is later ejected as a small drop 30.

FIG. 16 includes an enlarged view of the orifice and meniscus of FIG. 15 at t=1.36, or shortly after the propelling portion of fluid manipulation has begun. Superimposed on the edge of meniscus 34 are the velocity vectors for the surface of the meniscus. Note the longer (higher velocity) vectors from the core 97 of the meniscus beginning to protrude from the generally concave meniscus shape. The core vectors are both higher in magnitude than the vectors near the edges, and also more downward in direction. The shorter velocity vectors in the concave portion of meniscus 34 have an orientation pointing toward the core section 97, indicating a degree of fluid flow from the annulus surrounding the core toward the core.

The value for the characteristic time, $t_c$, permits a rough scaling of the Type 3 waveforms shown herein. For example, waveform 320 shown used for a 38/62 water/glycerol fluid could be roughly scaled for fluids of different density and surface tension, as well as for a different size orifice, by use of a non-dimensional time scalar comprising the ratio of the characteristics times of the two fluids. With regards to fluids of different viscosity, the Ohnesorge number, Oh, also permits a rough scaling of waveforms, where:

$$O_h = \mu/(\rho R \sigma)^{1/2}$$

in which $\mu$ is the viscosity of the fluid.

TABLE 1

Waveform 100

| microseconds | volts |
|---|---|
| 0 | 0 |
| .5 | 86 |
| 32 | 86 |
| 32.5 | 0 |

TABLE 2

Waveform 200

| microseconds | volts |
|---|---|
| 0 | 0 |
| .5 | −48 |
| 36 | −48 |
| 36.5 | 52 |
| 72.5 | 52 |
| 73 | 0 |

TABLE 2.2

Waveform 220

| microseconds | volts |
|---|---|
| 0 | 0 |
| 20 | −85 |
| 500 | −85 |
| 500.5 | +85 |
| 980 | +85 |
| 1000 | 0 |

TABLE 3.0

Waveform 300

| microseconds | volts |
|---|---|
| 0 | 0 |
| 0.5 | −50 |
| 36 | −50 |
| 36.5 | +50 |
| 54.5 | +50 |
| 55 | −50 |
| 90.5 | −50 |
| 91 | 0 |

TABLE 3.2

Waveform 320

| microseconds | volts |
|---|---|
| 0 | 0 |
| 20 | −104 |
| 500 | −104 |
| 500.5 | 104 |
| 506.5 | 104 |
| 532.5 | −104 |
| 1532.5 | 0 |

TABLE 3.4

Waveform 340

| microseconds | volts |
|---|---|
| 0 | 0 |
| 0.5 | −43.2 |
| 36 | −43.2 |
| 36.5 | 44 |
| 54.5 | 44 |
| 55 | −43.2 |
| 126 | 0 |

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed:

1. A method for expelling a drop of a fluid from an orifice, comprising:

providing a body defining a passageway terminating at an orifice, fluid being contained in the passageway proximate to the orifice, said fluid forming a meniscus in the passageway;

a first withdrawing of the fluid in the passageway in a first direction from the orifice;

after said first withdrawing, propelling the fluid in the passageway in a second direction opposite to the first direction and toward the orifice;

after said propelling, performing a second withdrawing of the fluid in the passageway in the first direction;

continuing said second withdrawing for a duration of time sufficient to begin retracting the portion of the meniscus in contact with the orifice;

ending said second withdrawing; and after beginning said retracting, expelling a drop of the fluid from the orifice;

wherein said first withdrawing is for a first duration of time, and said propelling is for a second duration of time less than the first duration of time.

2. The method of claim 1 wherein the second duration is less than half the first duration.

3. A method for expelling a drop of a fluid from an orifice, comprising:

providing a body defining a passageway terminating at an orifice, fluid being contained in the passageway proximate to the orifice, said fluid forming a meniscus in the passageway;

a first withdrawing of the fluid in the passageway in a first direction from the orifice;

after said first withdrawing, propelling the fluid in the passageway in a second direction opposite to the first direction and toward the orifice;

after said propelling, performing a second withdrawing of the fluid in the passageway in the first direction;

continuing said second withdrawing for a duration of time sufficient to begin retracting the portion of the meniscus in contact with the orifice;

ending said second withdrawing; and after beginning said retracting, expelling a drop of the fluid from the orifice;

wherein said first withdrawing is for a first duration of time, said propelling is for a second duration of time, said second withdrawing is for a third duration of time, and the second duration of time is less than the third duration of time, and the second duration of time is less than the first duration of time.

4. A method for expelling a drop of a fluid from an orifice, comprising:

providing a body defining a passageway terminating at an orifice, fluid being contained in the passageway proximate to the orifice;

a first withdrawing of the fluid in the passageway in a first direction from the orifice for a first duration of time;

after said first withdrawing, propelling the fluid in the passageway in a second direction opposite to the first direction and toward the orifice for a second duration of time less than the first duration;

after said propelling, a second withdrawing of the fluid in the passageway in the first direction; and expelling a drop of the fluid from the orifice.

5. The method of claim 4 wherein said fluid forms a meniscus in the passageway, and said second withdrawing retracts the edges of the meniscus before said expelling a drop.

6. The method of claim 4 wherein said second withdrawing is for a third duration of time, and the second duration of time is less than the third duration of time.

7. The method of claim 4 wherein said second withdrawing has a beginning, and said expelling is after the beginning of said second withdrawing.

8. The method of claim 4 wherein the orifice has a first diameter, the expelled drop has a second diameter, and the second diameter is less than the first diameter.

9. The method of claim 4 wherein the second duration is less than half the first duration.

10. A method for expelling a drop of a fluid from an orifice, comprising:

providing a body defining a passageway terminating at an orifice, fluid being contained in the passageway proximate to the orifice;

a first withdrawing of the fluid in the passageway in a first direction from the orifice;

after said first withdrawing, propelling the fluid in the passageway in a second direction opposite to the first direction and toward the orifice for a first duration of time;

after said propelling, a second withdrawing of the fluid in the passageway in the first direction for a second duration of time greater than the first duration; and expelling a drop of the fluid from the orifice.

11. The method of claim 10 wherein orifice has a first diameter, the fluid forms a meniscus in the passageway, said propelling is for a duration of time sufficient to create a tongue of fluid extending from the meniscus during said second withdrawing, and the tongue separates as the expelled drop with a second diameter is less than the first diameter.

12. The method of claim 10 wherein said fluid forms a meniscus in the passageway, and said second withdrawing continues for a duration sufficient to prevent the edges of the meniscus from separating from the passageway before said expelling a drop.

13. The method of claim 10 wherein said second withdrawing has an ending, and said expelling is after the ending of said second withdrawing.

14. The method of claim 10 wherein said first withdrawing is for a first duration of time, said propelling is for a second duration of time, said second withdrawing is for a third duration of time, and the sum of the first, second, and third durations is less than about 2000 microseconds.

15. The method of claim 10 wherein the first duration is less than half the second duration.

16. A method for expelling a drop of a fluid from an orifice, comprising:

provide a body defining a passageway terminating at an orifice, fluid being contained in the passageway proximate to the orifice, said fluid forming a meniscus in the passageway;

a first withdrawing of the fluid in the passageway in a first direction from the orifice;

after said first withdrawing, propelling the fluid in the passageway in a second direction opposite to the first direction and toward the orifice;

after said propelling, beginning a second withdrawing of the fluid in the passageway in the first direction, said second withdrawing retracting the meniscus toward the passageway; and after retracting, expelling a drop of the fluid from the orifice;

wherein said first withdrawing is for a first duration of time, and said propelling is for a second duration of time less than the first duration of time.

17. The method of claim 16 wherein the second duration is less than one half the first duration.

18. A method for expelling a drop of a fluid from an orifice, comprising:

providing a body defining a passageway terminating at an orifice, fluid being contained in the passageway proximate to the orifice, said fluid forming a meniscus in the passageway;

a first withdrawing of the fluid in the passageway in a first direction from the orifice;

after said first withdrawing, propelling the fluid in the passageway in a second direction opposite to the first direction and toward the orifice;

after said propelling, beginning a second withdrawing of the fluid in the passageway in the first direction, said second withdrawing retracting the meniscus toward the passageway; and after retracting, expelling a drop of the fluid from the orifice;

wherein said second withdrawing is for a first duration of time, and said propelling is for a second duration of time less than the first duration of time.

19. The method of claim 16 wherein said second withdrawing is for a third duration of time, and the second duration of time is less than the third duration of time.

20. An apparatus for ejecting a drop of a fluid from an orifice, comprising:

a body defining a passageway terminating at an orifice, a reservoir of fluid in said passageway, said fluid forming a meniscus in said passageway;

a piezoelectric element coupled to said body and actuatable to withdraw fluid in said passageway away from the orifice and actuatable to propel fluid in said passageway toward said orifice; and a controller providing a control signal to actuate said piezoelectric driver and including first, second, and third portions, said piezoelectric element withdrawing fluid in said passageway toward the interior in response to the first and third portions, said piezoelectric element propelling fluid in said passageway toward said orifice in response to the second portion, the second portion following the first portion, and the third portion following the second portion;

wherein the first portion retracts the meniscus from the orifice with a first velocity, the second portion propels the fluid in the center of the passageway toward the orifice with a second velocity greater than the first velocity, the third portion retracts the meniscus from the orifice, and an outward tongue of fluid forms on the meniscus after the retraction, separates from the meniscus, and is ejected as a drop.

21. The apparatus of claim 20 wherein said piezoelectric actuator has a neutral position, said control signal includes a neutral state corresponding to the neutral position, the third portion of said control signal includes a maximum amplitude, a first transition from the neutral state to the maximum amplitude, a second transition from the maximum amplitude to the neutral state, and the first transition is faster than the second transition.

22. The apparatus of claim 20 wherein body includes a capillary tube with an outer diameter and said piezoelectric element couples to the outer diameter.

23. The apparatus of claim 20 wherein the fluid is a DNA solution including at least one of a nucleotide monomer or an oligonucleotide.

24. The apparatus of claim 20 wherein the duration of the second portion is less than half the duration of the first portion.

25. An apparatus for ejecting a drop of a fluid from an orifice, comprising:

a body defining a passageway terminating at an orifice and a reservoir of fluid in said passageway;

a piezoelectric element coupled to a portion of said body and actuatable in a first direction to withdraw fluid in said passageway away from the orifice and actuatable in a second direction to propel fluid in said passageway toward said orifice, said piezoelectric element having a neutral position; and a controller providing a control signal to actuate said piezoelectric driver, said control signal being adapted and configured to provide a first transition from the neutral position of said piezoelectric element to a first state of fluid withdrawal, a second transition from the first state of withdrawal through the neutral position of said piezoelectric element to a second state of fluid propulsion, and a third transition from the second state of propulsion through the neutral position of said piezoelectric element to a third state of fluid withdrawal.

26. The apparatus of claim 25 wherein said control signal is adapted and configured to include a first period of time from the first transition to the second transition, a second period of time from the second transition to the third transition, and the second period is less than the first period.

27. The apparatus of claim 25 wherein said control signal includes a fourth transition from the third state of withdrawal to the neutral position, and is adapted and configured to include a first period of time from the second transition to the third transition, a second period of time from the third transition to the fourth transition, and the first period is less than the second period.

28. The apparatus of claim 25 wherein body includes a capillary tube with an outer diameter and said piezoelectric element couples to the outer diameter.

29. The apparatus of claim 25 wherein the fluid is a DNA solution including at least one of a nucleotide monomer or an oligonucleotide.

30. The apparatus of claim 25 wherein the third state does not exceed the first state.

31. The method of claim 25 wherein a drop is ejected after the third transition, the orifice has a first diameter, the expelled drop has a second diameter, and the second diameter is less than the first diameter.

* * * * *

UNITED STATES PATENT AND TRADEMARK OFFICE
CERTIFICATE OF CORRECTION

PATENT NO. : 6,513,894 B1  Page 1 of 1
DATED : February 4, 2003
INVENTOR(S) : Alvin U. Chen et al.

It is certified that error appears in the above-identified patent and that said Letters Patent is hereby corrected as shown below:

<u>Title page,</u>
Item [56], OTHER PUBLICATIONS, "Burr et al.," please change "Piezoelectiic" to -- Piezoelectric --; "Hayes et al.," please change "Electonic" to -- Electronic --.

<u>Column 2,</u>
Line 44, please delete "of the current".

<u>Column 6,</u>
Line 2, please change "the" to -- they --.
Line 22, please change "cameral" to -- camera --.

<u>Column 7,</u>
Line 3, please change "controls" to -- control --.
Line 29, please change "takes" to -- taken --.

Signed and Sealed this

Nineteenth Day of August, 2003

JAMES E. ROGAN
*Director of the United States Patent and Trademark Office*